(12) United States Patent
Choi et al.

(10) Patent No.: US 11,061,616 B2
(45) Date of Patent: Jul. 13, 2021

(54) MEMORY DEVICE AND METHOD OF OPERATING THE SAME

(71) Applicant: SK hynix Inc., Icheon-si (KR)

(72) Inventors: Won Jae Choi, Icheon-si (KR); Ki Chang Gwon, Yongin-si (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 32 days.

(21) Appl. No.: 16/729,183

(22) Filed: Dec. 27, 2019

(65) Prior Publication Data

US 2020/0363993 A1 Nov. 19, 2020

(30) Foreign Application Priority Data

May 17, 2019 (KR) .......... 10-2019-0058302

(51) Int. Cl.
*G06F 3/06* (2006.01)
(52) U.S. Cl.
CPC .......... *G06F 3/0659* (2013.01); *G06F 3/0604* (2013.01); *G06F 3/064* (2013.01); *G06F 3/0652* (2013.01); *G06F 3/0656* (2013.01); *G06F 3/0679* (2013.01)
(58) Field of Classification Search
CPC .... G06F 3/0679; G06F 3/0659; G06F 3/0619; G06F 3/064; G06F 3/0604; G06F 3/065; G06F 3/0656; G06F 3/0652; G11C 16/10

USPC ......................................................... 711/103
See application file for complete search history.

(56) References Cited

U.S. PATENT DOCUMENTS

| | | | |
|---|---|---|---|
| 9,269,451 B2 | 2/2016 | Ellis | |
| 2009/0300238 A1* | 12/2009 | Panabaker | G06F 3/0605 710/62 |
| 2017/0337979 A1* | 11/2017 | Lee | G11C 16/3418 |
| 2019/0378565 A1* | 12/2019 | Yuan | G11C 11/40626 |

FOREIGN PATENT DOCUMENTS

KR 100512501 B1 9/2005

* cited by examiner

*Primary Examiner* — Hashem Farrokh
(74) *Attorney, Agent, or Firm* — William Park & Associates Ltd.

(57) ABSTRACT

The present technology relates to a memory device and a method of operating the memory device. The memory device includes a target block manager configured to store a target block address on which a refresh operation is to be performed and output a refresh signal for the target block corresponding to the target block address when an auto refresh command is received, and a data transmission controller configured to output a transmission signal and a buffer control signal for transmitting data between the target block or the buffer block and the temporary buffer circuit in response to the refresh signal.

26 Claims, 19 Drawing Sheets

MEMORY DEVICE AND METHOD OF OPERATING THE SAME

CROSS-REFERENCE TO RELATED APPLICATION

The present application claims priority under 35 U.S.C. § 119(a) to Korean patent application number 10-2019-0058302 filed on May 17, 2019, the entire disclosure of which is incorporated herein by reference in its entirety.

BACKGROUND

1. Technical Field

The present disclosure relates to a memory device and a method of operating the memory device, and more particularly, to a memory device capable of performing a refresh operation and a memory system including the memory device.

2. Related Art

A memory system is a device that stores data under the control of a host device such as a computer, a smart phone, or a smart pad. The memory system may include a memory device that stores data and a memory controller that controls the memory device according to a request from the host. The memory device may be divided into a volatile memory device and a non-volatile memory device according to a method of storing and maintaining data. A volatile memory device is a memory device in which stored data is erased when a power supply is interrupted, and a non-volatile memory device is a memory device in which stored data may be maintained even when a power supply is interrupted.

Here, the non-volatile memory device may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like.

The data stored in the non-volatile memory device is ideally required to be permanently maintained, but the stored data may be changed over time due to a physical characteristic of a memory cell in which the data is stored.

SUMMARY

An embodiment of the present disclosure provides a memory device capable of performing a refresh operation for preventing a change of data stored in a non-volatile memory device, and a method of operating the memory device.

A memory device according to an embodiment of the present disclosure includes a target block capable of storing data, a buffer block capable of temporarily storing the data of the target block during a refresh operation of the target block, a temporary buffer circuit configured to temporarily store or output the data of the target block or the buffer block in response to a buffer control signal, a target block manager configured to store a target block address of the target block on which the refresh operation is to be performed and output a refresh signal for the target block corresponding to the target block address when an auto refresh command is received, a data transmission controller configured to output a first transmission signal or a second transmission signal and the buffer control signal for transmitting the data between the target block or the buffer block and the temporary buffer circuit in response to the refresh signal, a block erase controller configured to output a first erase signal and the buffer control signal for erasing the target block when the data of the target block is transmitted from the temporary buffer circuit to the buffer block and configured to output a second erase signal and the buffer control signal for erasing the buffer block when the data of the target block is transmitted from the temporary buffer circuit back to the target block, and an operation circuit configured to transmit read, program, or erase operation voltages to the target block or the buffer block in response to the first or second transmission signal or the first or second erase signal.

A memory device according to an embodiment of the present disclosure includes a target block capable of storing data, a buffer block capable of temporarily storing the data of the target block during a refresh operation of the target block, a temporary buffer circuit configured to temporarily store or output the data of the target block or the buffer block in response to a buffer control signal, a target block manager configured to store and update a target block address of the target block on which the refresh operation is to be performed and repeatedly output a refresh signal for the target block corresponding to an updated target block address until a refresh end command is received, when a self refresh command is received, a data transmission controller configured to output a first transmission signal or a second transmission signal and the buffer control signal for transmitting the data between the target block or the buffer block and the temporary buffer circuit in response to the refresh signal, a block erase controller configured to output a first erase signal and the buffer control signal for erasing the target block when the data of the target block is transmitted from the temporary buffer circuit to the buffer block and configured to output a second erase signal and the buffer control signal for erasing the buffer block when the data of the target block is transmitted from the temporary buffer circuit back to the target block, and an operation circuit configured to transmit read, program, or erase operation voltages to the target block or the buffer block in response to the first or second transmission signal or the first or second erase signal.

A memory device according to an embodiment of the present disclosure includes a target block capable of storing data, a buffer block capable of temporarily storing the data of the target block during a refresh operation of the target block, a temporary buffer circuit configured to temporarily store or output the data of the target block or the buffer block, a refresh command determiner configured to receive an auto refresh command, a self refresh command, or a refresh end command and output an auto refresh signal, a self refresh start signal, or a self refresh end signal according to the received command, a target block manager configured to store a target block address of a next block when an auto refresh operation or a self refresh operation of the target block has ended and configured to output a refresh signal for controlling the refresh operation according to the auto refresh command, the self refresh command, or the refresh end command, a data transmission controller configured to control data transmission between the target block, the buffer block, and the temporary buffer circuit in response to the refresh signal, and a block erase controller configured to control an erase operation of the target block or the buffer block according to an order in which the data is transmitted from the temporary buffer circuit to the buffer block or the target block.

A method of operating a memory device according to an embodiment of the present disclosure includes transmitting data of a target block to a temporary buffer circuit when an auto refresh command is received, programming the data transmitted to the temporary buffer circuit to a buffer block, erasing the target block, transmitting the data programmed to the buffer block to the temporary buffer circuit, programming the data transmitted to the temporary buffer circuit back to the target block, and erasing the temporary buffer block.

A method of operating a memory device according to an embodiment of the present disclosure includes transmitting data of a target block to a temporary buffer circuit when a self refresh command is received, programming the data transmitted to the temporary buffer circuit to a buffer block, erasing the target block, transmitting the data programmed to the buffer block to the temporary buffer circuit, programming the data transmitted to the temporary buffer circuit back to the target block, erasing the temporary buffer block, and updating an address of a next block of the target block to a next target block. These method steps are repeated until a refresh end command is received.

The present technology may prevent a change of the data stored in the memory device by refreshing the data stored in the memory device, and thus the present technology may improve reliability of the memory device.

DETAILED DESCRIPTION

Figure 1:
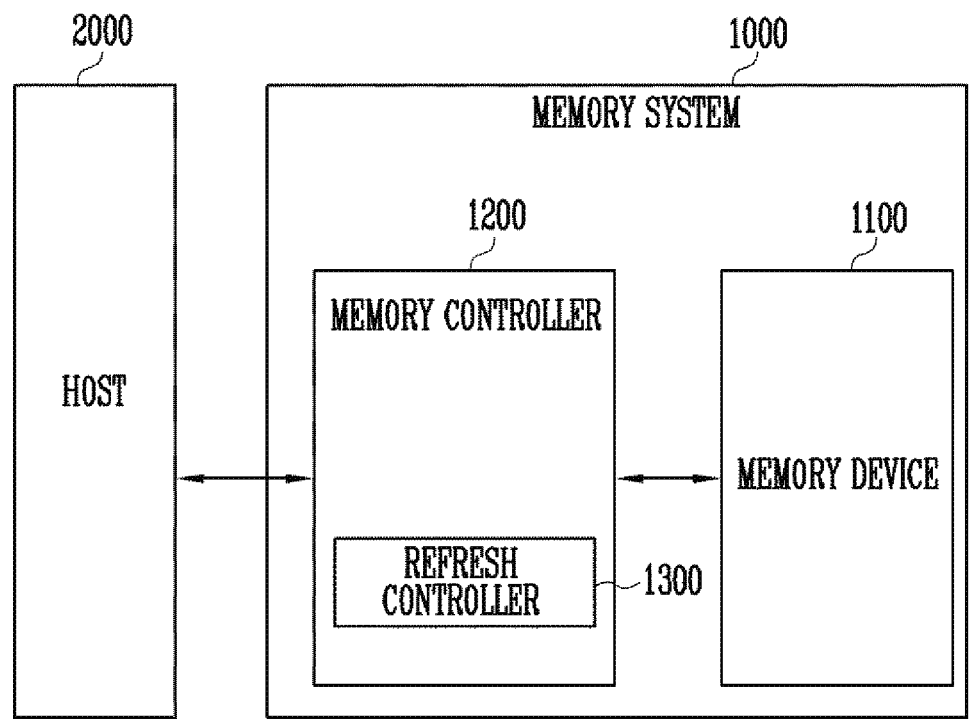
FIG. 1 is a diagram for describing a memory system according to an embodiment of the present disclosure.

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Because various modifications and changes may be applied to the embodiments according to the concept of the present disclosure and the embodiments according to the concept of the present disclosure may have various forms, the specific embodiments are illustrated in the drawings and described in the present specification or application. However, it should be understood that the embodiments according to the concept of the present disclosure are not construed as limited to a specific disclosure form and include all changes, equivalents, or substitutes that do not depart from the spirit and technical scope of the present disclosure.

While terms such as "first", "second", and/or the like may be used to describe various components, such components should not be limited to the above-described terms. The above-described terms are used only to distinguish one component from another component. For example, a first component may be referred to as a second component and similarly, a second component may be referred to as a first component without departing from the scope according to the concept of the present disclosure.

It should be understood that when a component is referred to as being "connected" or "coupled" to another component, the component may be directly connected or coupled to the other element or one or more intervening components may also be present. In contrast, it should be understood that when a component is referred to as being "directly connected" or "directly coupled" to another component, no intervening component is present. Other expressions describing relationships between components such as "~ between," "immediately ~ between" or "adjacent to ~", "directly adjacent to ~", and the like should be construed similarly.

The terms used in the present specification are merely used to describe a specific embodiment, and are not intended to limit the present disclosure. Singular expression includes a plural expression, unless the context clearly indicates otherwise. In the present specification, it should be understood that a term "include", "have", or the like indicates that a feature, a number, a step, an operation, a component, a part, or a combination thereof described in the present specification is present, but do not exclude a possibility of presence or addition of one or more other features, numbers, steps, operations, components, parts, or combinations thereof.

So far as not being differently defined, all terms used herein including technical or scientific terminologies have meanings that they are commonly understood by those skilled in the art to which the present disclosure pertains. The terms defined in generally used dictionaries should be construed as having the same meanings as would be construed in the context of the related art, and unless clearly defined otherwise in the present specification, should not be construed as having idealistic or excessively formal meanings.

In describing the embodiment, description of technical contents which are well known in the technical field of the present disclosure and are not directly related to the present disclosure are omitted. This intends to disclose the gist of the present disclosure more clearly by omitting unnecessary description.

Hereinafter, embodiments of the present disclosure are described in detail with reference to the accompanying drawings, so that those skilled in the art to which the present disclosure pertains may carry out the technical spirit of the present disclosure.

FIG. 1 is a diagram for describing a memory system according to an embodiment of the present disclosure.

Referring to FIG. 1, the memory system 1000 may include a memory device 1100 in which data is stored and a memory controller 1200 that may control the memory device 1100 in response to a request from a host 2000.

The memory device 1100 may operate in response to the control of the memory controller 1200. The memory device 1100 may include a plurality of memory blocks that store data. The memory blocks may include a plurality of memory cells. The memory device 1100 may be configured of a NAND flash memory, a vertical NAND flash memory, a NOR flash memory, a resistive random access memory (RRAM), a phase change memory (PRAM), a magneto resistive random access memory (MRAM), a ferroelectric random access memory (FRAM), a spin transfer torque random access memory (STT-RAM), or the like. In the present specification, it is assumed that the memory device 1100 is a NAND flash memory.

The memory controller 1200 may control the memory device 1100 in response to a request from the host 2000 and may perform a background operation of managing the memory device 1100 without the request from the host 2000. For example, the memory controller 1200 may perform a background operation such as wear leveling or garbage collection.

The memory controller 1200 may execute firmware such as a flash translation layer (FTL) for controlling communication between the host 2000 and the memory device 1100. The flash translation layer may receive data and a logical block address from the host 2000 and may convert the logical block address into a physical block address. To this end, the memory controller 1200 may store and manage a logical-physical address mapping table of the logical block address and the physical address.

The memory controller 1200 may control the memory device 1100 to perform a program operation, a read operation, an erase operation, or the like according to a request from the host 2000. During the program operation, the memory controller 1200 may provide a program command, the physical block address, and data to the memory device 1100. During the read operation, the memory controller 1200 may provide a read command and the physical block address to the memory device 1100. During the erase operation, the memory controller 1200 may provide an erase command and the physical block address to the memory device 1100.

The memory controller 1200 may include a buffer memory (not shown) for exchanging data between the host 2000 and the memory device 1100. The buffer memory may be included inside the memory controller 1200 or may be disposed outside the memory controller 1200. For example, the memory controller 1200 may temporarily store data input from the host 2000 in the buffer memory, and then transmit the data that is temporarily stored in the buffer memory to the memory device 1100. In addition, the buffer memory may be used as an operation memory and a cache memory of the memory controller 1200, and may store codes or commands executed by the memory controller 1200. For example, the buffer memory may be implemented by a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or Rambus dynamic random access memory (DRAM), or a static random access memory (SRAM).

In the present embodiment, the memory controller 1200 may include a refresh controller 1300 to maintain the data stored in the memory device 1100. That is, the memory controller 1200 may output various refresh commands so that the memory device 1100 may perform the refresh operation, and at this time, the refresh controller 1300 may be used.

A configuration of the memory controller 1200 capable of controlling the above-described refresh operation is specifically described as follows.

Figure 2:
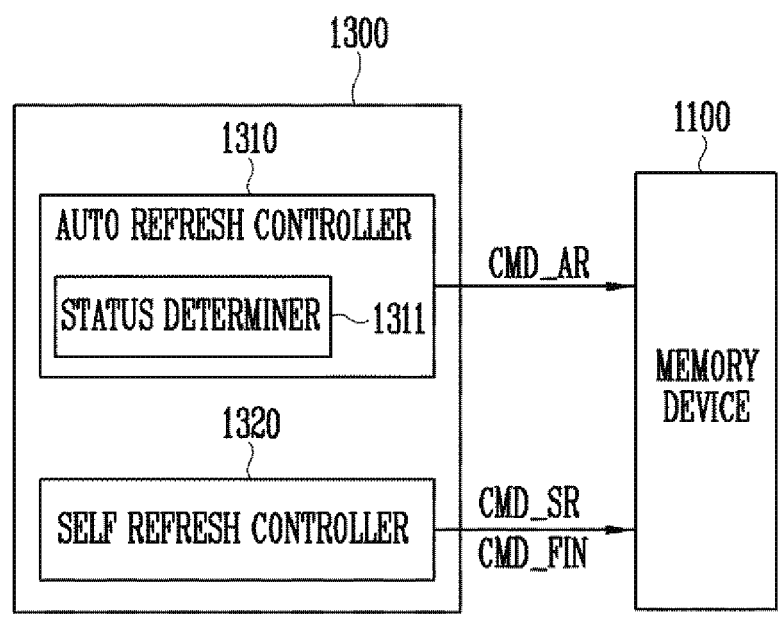
FIG. 2 is a diagram for specifically describing a refresh controller according to an embodiment of the present disclosure.

FIG. 2 is a diagram for specifically describing a refresh controller according to an embodiment of the present disclosure.

Referring to FIG. 2, the refresh controller 1300 may include an auto refresh controller 1310 and a self refresh controller 1320.

The auto refresh controller 1310 may output an auto refresh command CMD_AR that causes the memory device 1100 to perform a refresh operation for a selected memory block. In other words, the auto refresh command CMD_AR may be a command for performing a refresh operation for one selected target block.

Therefore, the memory device 1100 may end the refresh operation after performing the refresh operation for the target block that is a refresh target block in response to the auto refresh command CMD_AR. Here, the target block may be expressed as a victim block, but in the following embodiment, the refresh target block is defined as a target block.

The auto refresh controller 1310 may be activated when performing the background operation or when the memory device 1100 is in an idle status. To this end, the auto refresh controller 1310 may include a status determiner 1311 for determining a status of the memory device 1100. For example, the status determiner 1311 may output a status check signal to the memory device 1100. When the status signal received from the memory device 1100 indicates that all the status signals are idle status, the status determiner 1311 may generate an auto refresh enable signal for performing the auto refresh operation. The auto refresh controller 1310 may output the auto refresh command CMD_AR to the memory device 1100 when the status determiner 1311 generates the auto refresh enable signal.

The self refresh controller 1320 may output a self refresh command CMD_SR and a refresh end command CMD_FIN. The self refresh command CMD_SR may be a command that causes the memory device 1100 to perform a refresh operation while selecting the memory blocks by itself without an additional refresh command, and the refresh end command CMD_FIN may be a command for ending the self refresh operation performed by the memory device 1100. For example, after performing the refresh operation for the target block in response to the self refresh command CMD_SR, the memory device 1100 may newly select a next target block even though an additional refresh command is not received from the memory controller 1300, and may perform a refresh operation for the newly selected target block by itself. That is, the memory device 1100 may continuously perform the refresh operation while changing the target block until receiving the refresh end command CMD_FIN from a self refresh controller 1320. The self refresh controller 1320 may output the refresh end command CMD_FIN when a normal operation request is received from the host 2000 of FIG. 1 or when another background operation is to be performed.

The self refresh controller 1320 may also be activated when the memory device 1100 is in the idle status and thus may share the status determiner included in the auto refresh controller 1310.

For example, when a background operation other than the refresh operation is not being performed, the refresh controller 1300 may activate the self refresh controller 1320. When another background operation is being performed, a time during which the refresh operation is performed is short, and thus the refresh controller 1300 may activate the auto refresh controller 1310.

Figure 3:
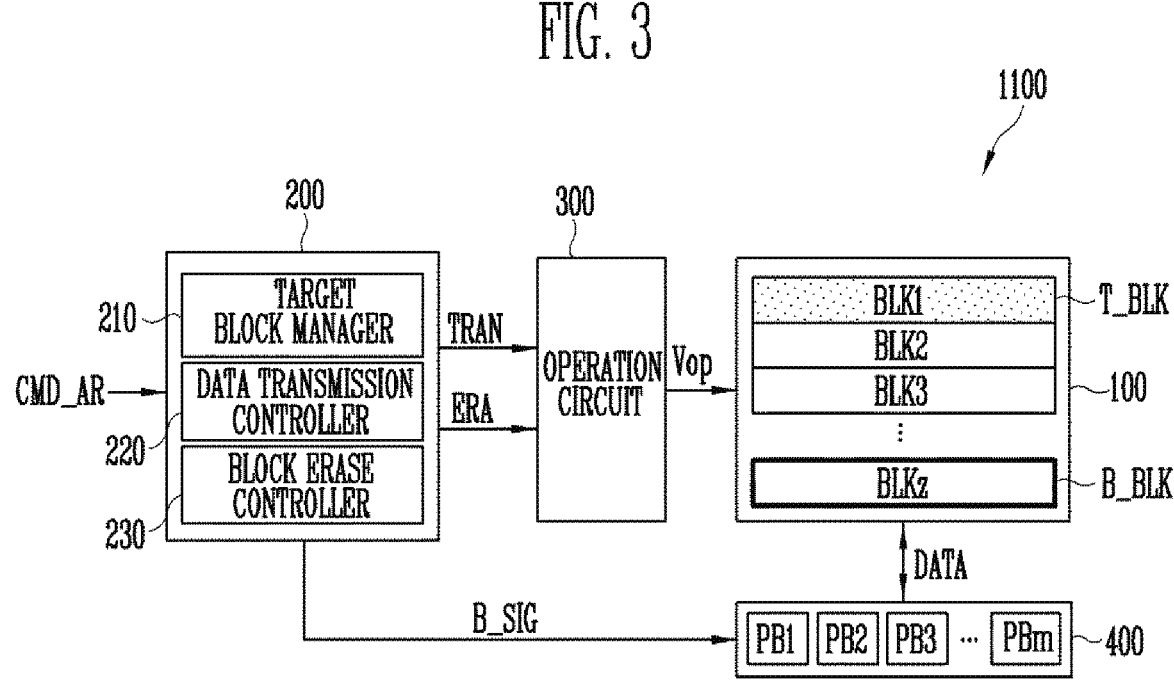
FIG. 3 is a diagram for specifically describing a memory device according to a first embodiment of the present disclosure.

FIG. 3 shows the refresh controller 1300 including both of the auto refresh controller 1310 and the self refresh controller 1320. However, the refresh controller 1300 may include only any one of the auto refresh controller 1310 and the self refresh controller 1320 according to the memory system 1000 of FIG. 1 in an embodiment.

FIG. 3 is a diagram for specifically describing a memory device according to a first embodiment of the present disclosure.

Referring to FIG. 3, the first embodiment shows a memory device 1100 capable of performing a refresh operation in response to an auto refresh command CMD_AR.

The memory device 1100 may include a memory cell array 100, control logic 200, an operation circuit 300, and a temporary buffer circuit 400.

The memory cell array 100 may include first to z-th memory blocks BLK1 to BLKz in which data is stored. Each of the first to z-th memory blocks BLK1 to BLKz may include a plurality of memory cells, and may be configured to be equal to each other. Any one block of the first to z-th memory blocks BLK1 to BLKz may be selected as a target block T_BLK and another block may be selected as a buffer block B_BLK. The target block T_BLK may be a memory block on which a refresh operation is to be performed and the buffer block B_BLK may be a memory block capable of temporarily storing data of the target block T_BLK during the refresh operation of the target block T_BLK. Therefore, an address of the target block T_BLK may be variable during the refresh operation, and an address of the buffer block B_BLK may be fixed for the refresh operation. That is, any one block for the refresh operation among the first to z-th memory blocks BLK1 to BLKz may be set as the buffer block B_BLK.

The control logic 200 may be configured to output control signals for performing an auto refresh operation in response to an auto refresh command CMD_AR. Specifically, the control logic 200 may include a target block manager 210, a data transmission controller 220, and a block erase controller 230. In addition, the control logic 200 may further include a configuration for performing a normal program, read, or erase operation. The control logic 200 may be implemented as hardware, software, or a combination of hardware and software. For example, the control logic 200 may be a control logic circuit operating in accordance with an algorithm and/or a processor executing control logic code.

The target block manager 210 may output a refresh signal for starting the refresh operation when the auto refresh command CMD_AR is received. The data transmission controller 220 may output a transmission signal TRAN and a buffer control signal B_SIG for reading data of the target block T_BLK or the buffer block B_BLK or for programming data in the target block T_BLK or the buffer block B_BLK during the refresh operation. The block erase controller 230 may output an erase signal ERA and the buffer control signal B_SIG for erasing the target block T_BLK or the buffer block B_BLK during the refresh operation.

The operation circuit 300 may generate and output operation voltages Vop for performing the read or program operation in response to the transmission signal TRAN or the erase signal ERA. For example, when reading data from the target block T_BLK during the refresh operation, the operation circuit 300 may transmit the operation voltages Vop for performing the read operation to the target block T_BLK. When reading data from the buffer block B_BLK during the refresh operation, the operation circuit 300 may transmit the operation voltages Vop for performing the read operation to the buffer block B_BLK. When programing data in the target block T_BLK during the refresh operation, the operation circuit 300 may transmit the operation voltages Vop for performing the program operation to the target block T_BLK. When programing data in the buffer block B_BLK during the refresh operation, the operation circuit 300 may transmit the operation voltages Vop for performing the program operation to the buffer block B_BLK.

The temporary buffer circuit 400 may include first to m-th page buffers PB1 to PBm. The first to m-th page buffers PB1 to PBm may be connected to the first to z-th memory blocks BLK1 to BLKz through bit lines to transmit and receive data DATA. For example, the first to m-th page buffers PB1 to PBm may temporarily store the data read from the target block T_BLK in response to the buffer control signal B_SIG during the refresh operation, and may transmit the temporarily stored data to the buffer block B_BLK. On the contrary, the first to m-th page buffers PB1 to PBm may temporarily store the data read from the buffer block B_BLK in response to the buffer control signal B_SIG during the refresh operation, and may transmit the temporarily stored data to the target block T_BLK.

An operation method of the above-described devices during the refresh operation is specifically described as follows.

Figure 4:
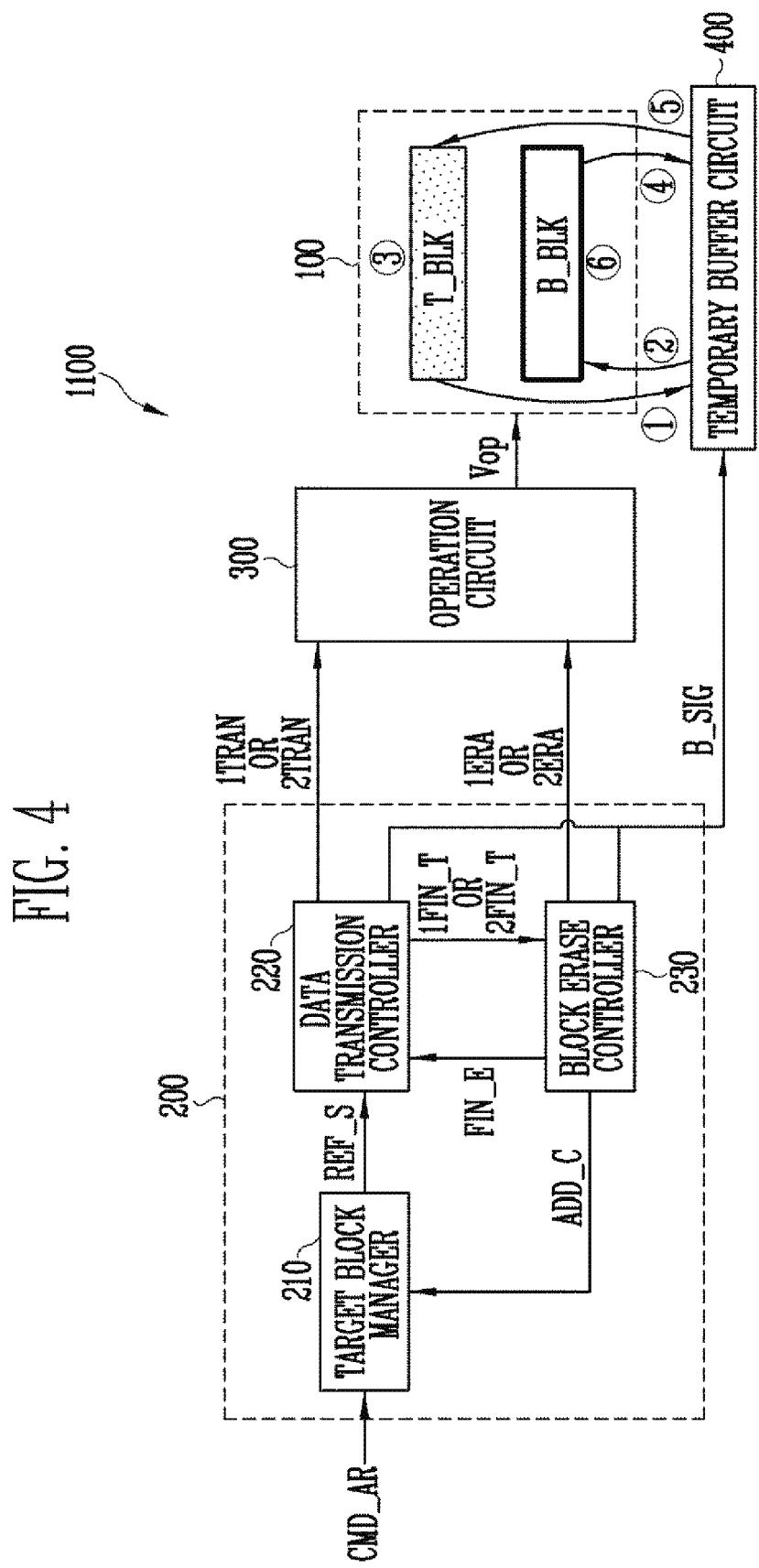
FIG. 4 is a diagram for specifically describing a control logic shown in FIG. 3 and a method of operating the same.

FIG. 4 is a diagram for specifically describing the control logic shown in FIG. 3 and a method of operating the same.

Referring to FIG. 4, the target block manager 210 may store the address of the target block T_BLK. When the auto refresh command CMD_AR is received, the target block manager 210 may output a refresh signal REF_S for performing the auto refresh operation together with the address (hereinafter, a target block address) of the target block T_BLK. The target block address may be set to an address of a block next to a block on which the refresh operation is performed. For example, the target block address may be sequentially selected in accordance with a predetermined order, or may be selected according to a current state of the memory blocks. For example, when the auto refresh operation for a first memory block BLK1 is performed, an address of a second memory block BLK2 that is a next target may be set as a target block address when the auto refresh operation for the first memory block BLK1 has ended.

Therefore, when the auto refresh command CMD_AR is received, the target block manager 210 may output the refresh signal REF_S for refreshing the memory block corresponding to a target block address that is set in advance.

The data transmission controller 220 may transmit the data stored in the target block T_BLK to the temporary buffer circuit 400 in response to the refresh signal REF_S (①) and may output a first transmission signal 1TRAN and the buffer control signal B_SIG for transmitting (②) the data that is temporarily stored in the temporary buffer circuit 400 to the buffer block B_BLK. For example, the first transmission signal 1TRAN may be a signal for reading the data of the target block T_BLK and then programming the data that is temporarily stored in the temporary buffer circuit 400 to the buffer block B_BLK, and the buffer control signal B_SIG may be a signal for sensing and temporarily storing the data of the target block T_BLK and then transmitting the temporarily stored data to the buffer block B_BLK.

After the operation circuit 300 outputs the operation voltages Vop for reading the target block T_BLK in response to the first transmission signal 1TRAN, the operation circuit 300 may output the operation voltages Vop for programming the data of the target block T_BLK, which is temporarily stored in the temporary buffer circuit 400, to the buffer block B_BLK. That is, the operation circuit 300 may output the operation voltages Vop for copying back the data stored in the target block T_BLK to the buffer block B_BLK, in response to the first transmission signal 1TRAN. For example, the operation voltages Vop output in response to the first transmission signal 1TRAN may include a read voltage, a read pass voltage, a program voltage, a program pass voltage, and a program verify voltage.

When all the data stored in the target block T_BLK are transmitted to the buffer block B_BLK according to the first transmission signal 1TRAN and the buffer control signal B_SIG, the data transmission controller 220 may output a first transmission end signal 1FIN_T to the block erase controller 230.

The block erase controller 230 may output a first erase signal 1ERA and the buffer control signal B_SIG for erasing (③) the target block T_BLK when the first transmission end signal 1FIN_T is input.

The operation circuit 300 may output the operation voltages Vop for erasing the target block T_BLK in response to the first erase signal 1ERA. For example, the operation voltages Vop output in response to the first erase signal 1ERA may include an erase voltage, an erase pass voltage, and an erase verify voltage. Alternatively, depending on a method in which the erase operation is performed, the operation circuit 300 may float all word lines or may apply a voltage of 0 V to the word lines instead the operation circuit 300 might not apply the operation voltages Vop to the word lines connected to the target block T_BLK.

When the target block T_BLK is erased according to the first erase signal 1ERA and the buffer control signal B_SIG, the block erase controller 230 may output an erase end signal FIN_E to the data transmission controller 220.

The data transmission controller 220 may transmit the data stored in the buffer block B_BLK to the temporary buffer circuit 400 in response to the erase end signal FIN_E (④) and may output a second transmission signal 2TRAN and the buffer control signal B_SIG for transmitting (⑤) the data that is temporarily stored in the temporary buffer circuit 400 to the target block T_BLK. For example, the second transmission signal 2TRAN may be a signal for reading the data of the buffer block B_BLK and then programming the data that is temporarily stored in the temporary buffer circuit 400 to the target block T_BLK, and the buffer control signal B_SIG may be a signal for sensing and temporarily storing the data of the buffer block B_BLK and then transmitting the temporarily stored data to the target block T_BLK.

After the operation circuit 300 outputs the operation voltages Vop for reading the buffer block B_BLK in response to the second transmission signal 2TRAN, the operation circuit 300 may output the operation voltages Vop for programming the data of the buffer block B_BLK, which is temporarily stored in the temporary buffer circuit 400, to the target block T_BLK. That is, the operation circuit 300 may output the operation voltages Vop for copying back the data stored in the buffer block B_BLK to the target block T_BLK, in response to the second transmission signal 2TRAN. For example, the operation voltages Vop output in response to the second transmission signal 2TRAN may include a read voltage, a read pass voltage, a program voltage, a program pass voltage, and a program verify voltage.

When all the data stored in the buffer block B_BLK are transmitted to the target block T_BLK according to the second transmission signal 2TRAN and the buffer control signal B_SIG, the data transmission controller 220 may output a second transmission end signal 2FIN_T to the block erase controller 230.

The block erase controller 230 may output a second erase signal 2ERA and the buffer control signal B_SIG for erasing (⑥) the buffer block B_BLK when the second transmission end signal 2FIN_T is input.

The operation circuit 300 may output the operation voltages Vop for erasing the buffer block B_BLK in response to the second erase signal 2ERA. For example, the operation voltages Vop output in response to the second erase signal 2ERA may include an erase voltage, an erase pass voltage, and an erase verify voltage. Alternatively, depending on a method in which the erase operation is performed, the operation circuit 300 may float all word lines or may apply a voltage of 0 V to the word lines instead the operation circuit 300 might not apply the operation voltages Vop to the word lines connected to the target block T_BLK.

When the buffer block B_BLK is erased according to the second erase signal 2ERA and the buffer control signal B_SIG, the block erase controller 230 may output an address count signal ADD_C to a target block manager 210.

When the address count signal ADD_C is input, the target block manager 210 may update the address of the block for which the refresh operation has ended to an address of the next block, and then may end the auto refresh operation.

Figure 5:
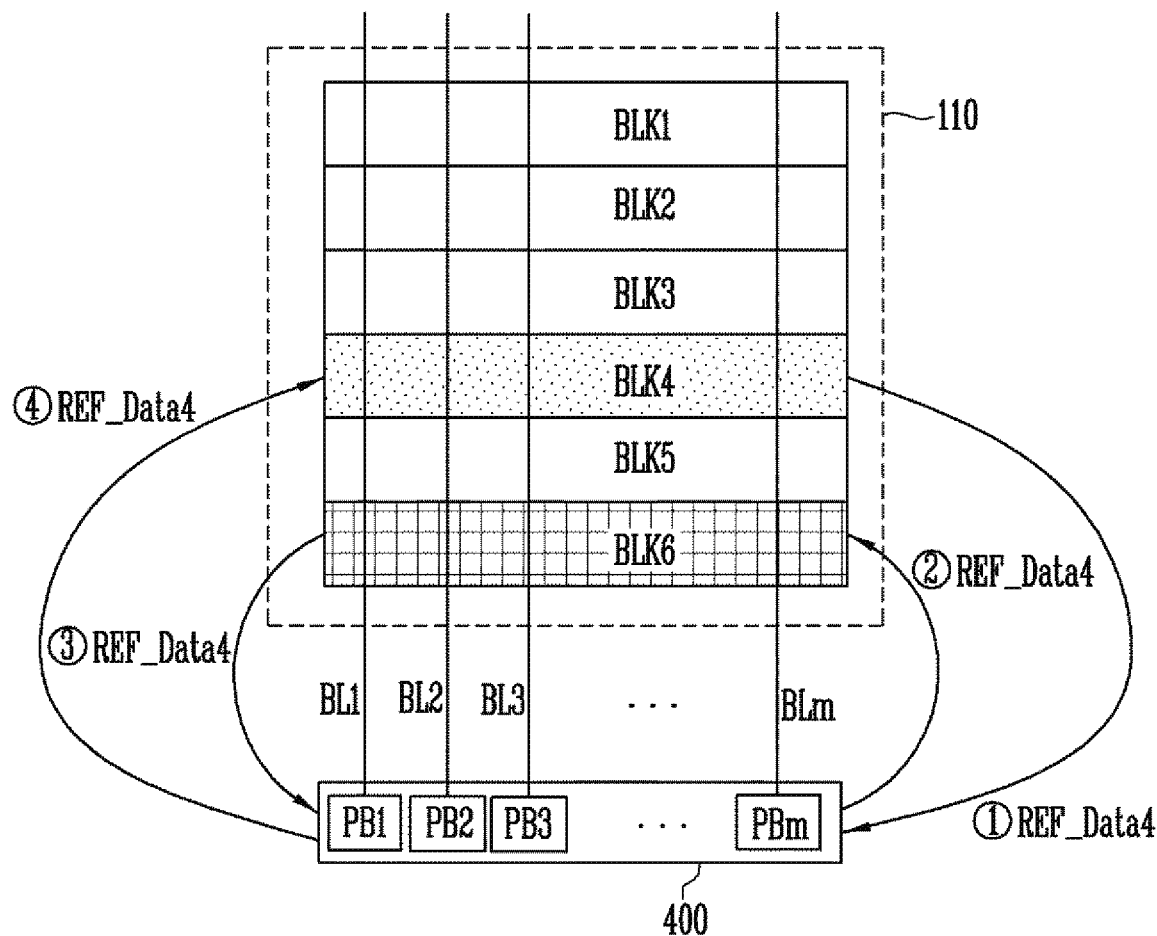
FIGS. 5A and 5B are diagrams for describing a refresh operation of a memory device including one plane.

FIGS. 5A and 5B are diagrams for describing a refresh operation of a memory device including one plane.

FIG. 5A shows a refresh operation performed in the same plane, and FIG. 5B shows a position where data is stored before and after the refresh operation.

Referring to FIG. 5A, the memory cell array 110 may include a plane, and the plane may include a plurality of memory blocks. In FIG. 5A, first to sixth memory blocks BLK1 to BLK6 are included in the plane, but the number of memory blocks included in the plane is not limited thereto. Each of the first to sixth memory blocks BLK1 to BLK6 may include a plurality of pages, and each of the pages may include a plurality of memory cells.

In FIG. 5A, it is assumed that the first to fifth memory blocks BLK1 to BLK5 are memory blocks for storing data, and the sixth memory block BLK6 is a memory block allocated for performing a refresh operation. That is, the sixth memory block BLK6 allocated for performing the refresh operation may be the buffer block B_BLK of FIG. 4.

Therefore, the sixth memory block BLK6 may maintain the erase status before the refresh operation is performed and after the refresh operation is performed.

When the fourth memory block BLK4 among the first to fifth memory blocks BLK1 to BLK5 is the target block T_BLK of FIG. 4, the data stored in the fourth memory block BLK4 may be a fourth refresh data REF_Data4. Referring to FIGS. 4 and 5A, a refresh operation of the fourth memory block BLK 4 is specifically described as follows.

The data transmission controller 220 may transmit fourth refresh data stored in the fourth memory block BLK4 to the temporary buffer circuit 400 in response to the refresh signal REF_S (①) and may output a first transmission signal 1TRAN and a buffer control signal B_SIG for transmitting (②) the data that is temporarily stored in the temporary buffer circuit 400 to the sixth memory block BLK6.

After the operation circuit 300 outputs operation voltages Vop for reading the fourth memory block BLK4 in response to the first transmission signal 1TRAN, the operation circuit 300 may output operation voltages Vop for programming the data of the fourth memory block BLK4, which is temporarily stored in the temporary buffer circuit 400, to the sixth memory block BLK6. That is, the operation circuit 300 may output the operation voltages Vop for copying back the data stored in the fourth memory block BLK4 to the sixth memory block BLK6, in response to the first transmission signal 1TRAN. For example, the operation voltages Vop output in response to the first transmission signal 1TRAN may include a read voltage, a read pass voltage, a program voltage, a program pass voltage, and a program verify voltage.

When all the data stored in the fourth memory block BLK4 are transmitted to the sixth memory block BLK6 according to the first transmission signal 1TRAN and the buffer control signal B_SIG, the data transmission controller 220 may output a first transmission end signal 1FIN_T to the block erase controller 230.

When the fourth memory block BLK4 is erased, the block erase controller 230 may output an erase end signal FIN_E to the data transmission controller 220. The data transmission controller 220 may transmit the data stored in the sixth memory block BLK6 to the temporary buffer circuit 400 in response to the erase end signal FIN_E (③) and may output a second transmission signal 2TRAN and the buffer control signal B_SIG for transmitting (④) the data that is temporarily stored in the temporary buffer circuit 400 to the fourth memory block BLK4.

After the operation circuit 300 outputs the operation voltages Vop for reading the sixth memory block BLK6 in response to the second transmission signal 2TRAN, the operation circuit 300 may output operation voltages Vop for programming the data of the sixth memory block BLK6, which is temporarily stored in the temporary buffer circuit 400, to the fourth memory block BLK4. That is, the operation circuit 300 may output the operation voltages Vop for copying back the data stored in the fourth memory block BLK4 to the sixth memory block BLK6, in response to the second transmission signal 2TRAN. For example, the operation voltages Vop output in response to the second transmission signal 2TRAN may include a read voltage, a read pass voltage, a program voltage, a program pass voltage, and a program verify voltage.

When all the data stored in the sixth memory block BLK6 are transmitted to the fourth memory block BLK4 through the temporary buffer circuit 400 according to the second transmission signal 2TRAN and the buffer control signal B_SIG, the data transmission controller 220 may output a second transmission end signal 2FIN_T to the block erase controller 230.

The block erase controller 230 may output a second erase signal 2ERA and the buffer control signal B_SIG for erasing the sixth memory block BLK6 when the second transmission end signal 2FIN_T is input.

The operation circuit 300 may output operation voltages Vop for erasing the sixth memory block BLK6 in response to the second erase signal 2ERA. For example, the operation voltages Vop output in response to the second erase signal 2ERA may include an erase voltage, an erase pass voltage, and an erase verify voltage. Alternatively, depending on a method in which the erase operation is performed, the operation circuit 300 may float all word lines or may apply a voltage of 0 V to the word lines instead the operation circuit 300 might not apply the operation voltages Vop to the word lines connected to the fourth memory block BLK4.

When the sixth memory block BLK6 is erased according to the second erase signal 2ERA and the buffer control signal B_SIG, the block erase controller 230 may output an address count signal ADD_C to a target block manager 210.

When the address count signal ADD_C is input, the target block manager 210 may update the address of the block for which the refresh operation has ended to an address of the next block, and then may end the auto refresh operation.

In the existing refresh operation, the data programmed in the target block T_BLK is read and output to the memory controller, and then the program operation is performed on the target block using the data read to the memory controller. However, in the refresh operation according to the present embodiment, the data programmed in the target block T_BLK is temporarily stored in the buffer block B_BLK without being output to the memory controller, and then the data programmed in the buffer block B_BLK may be reprogrammed.

As a result, the refresh operation according to the present disclosure may be performed inside the memory device without data input and output between the memory device and the memory controller. Therefore, the memory controller does not generate mapping data for reprogramming the data programmed to the target block. Thus, cost for generating and managing the mapping data during the refresh operation does not occur.

Figure 6:
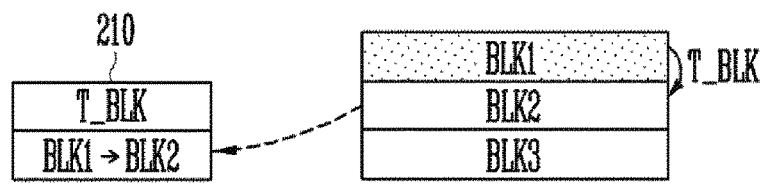
FIG. 6 is a diagram for describing a method of managing a target block address stored in a target block manager.

FIG. 6 is a diagram for describing a method of managing a target block address stored in a target block manager.

Referring to FIG. 6, the target block manager 210 may store and update a target block address. For example, when an address of a first memory block BLK1 is stored as the target block address, a refresh operation may be performed on the first memory block BLK1. When the refresh operation of the first memory block BLK1 has ended, the target block manager 210 may change the target block address from the first memory block BLK1 to an address of the second memory block BLK2. In the auto refresh operation according to the first embodiment, only a refresh operation for a selected target block T_BLK may be performed. Therefore, when the refresh operation of the selected target block T_BLK has ended, only the target block address may be updated to the address of the memory block BLK2 for the next refresh operation, and the auto refresh operation may be ended.

The target block address for the next refresh operation may be sequentially selected in accordance with a predetermined order, but may be selected in consideration of a current state of the memory blocks included in the memory device. For example, among the plurality of memory blocks included in the memory device, an address of a memory block on which the next refresh is to be performed may be selected as the next target block address based on a time at which the program operation is performed. More specifically, the address of the memory block may be selected in an order of an elapsed time from a time at which the program operation is performed.

Figure 7:
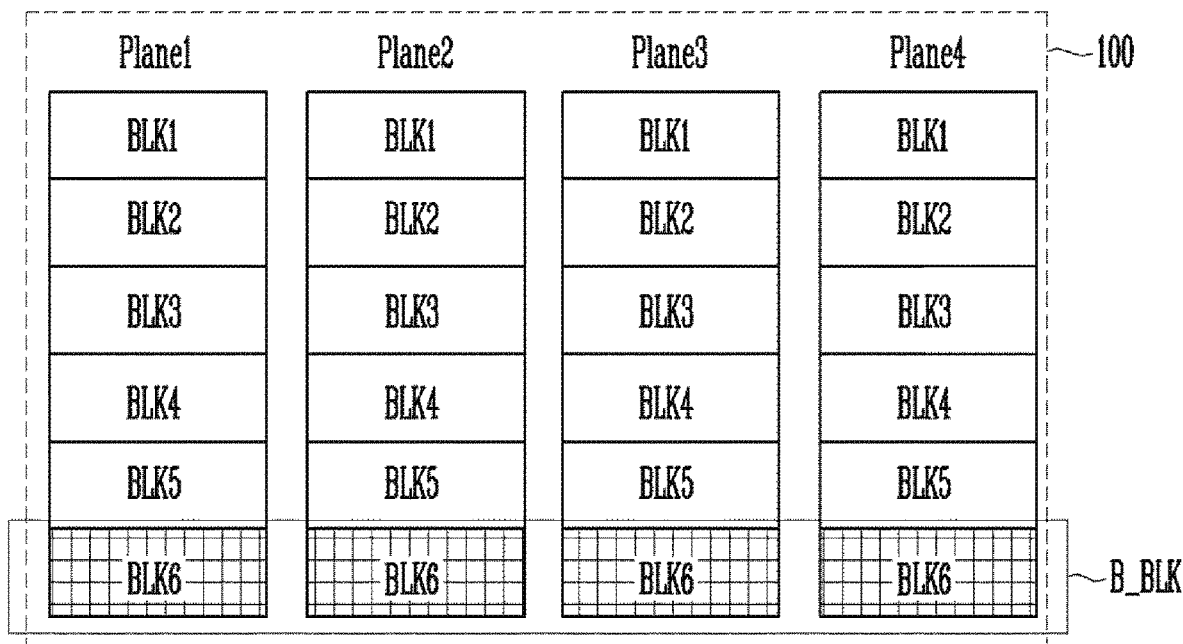
FIG. 7 is a diagram for describing a memory cell array including a plurality of planes.

FIG. 7 is a diagram for describing a memory cell array including a plurality of planes. Referring to FIG. 7, the memory cell array 100 of a selected memory device may include a plurality of planes Plane 1, Plane 2, Plane 3, and Plane 4. For example, when the memory cell array 100 includes the first to fourth planes Plane 1, Plane 2, Plane 3, and Plane 4, a buffer block B_BLK may be set to each of the first to fourth planes Plane 1, Plane 2, Plane 3, and Plane 4, or may be set in at least one plane of the first to fourth planes Plane 1, Plane 2, Plane 3, and Plane 4. For example, when each of the first to fourth planes Plane 1, Plane 2, Plane 3, and Plane 4 includes first to sixth memory blocks BLK1 to BLK6, the first to fifth memory blocks BLK1 to BLK5 may be used for storing normal data (or user data) and the sixth memory block BLK6 may be used for temporarily storing data of a target block T_BLK during a refresh operation. Therefore, the buffer block B_BLK may always be maintained in an erase status before the refresh operation is performed.

When the target block T_BLK and the buffer block B_BLK are included in the same plane, data may be transmitted using the temporary buffer circuit 400 commonly connected to the target block T_BLK and the buffer block B_BLK as described above with reference to FIG. 4.

When the target block T_BLK and the buffer block B_BLK are included in different planes, data may be transmitted through different temporary buffer circuits. The data transmission method in this case is specifically described as follows.

Figure 8:
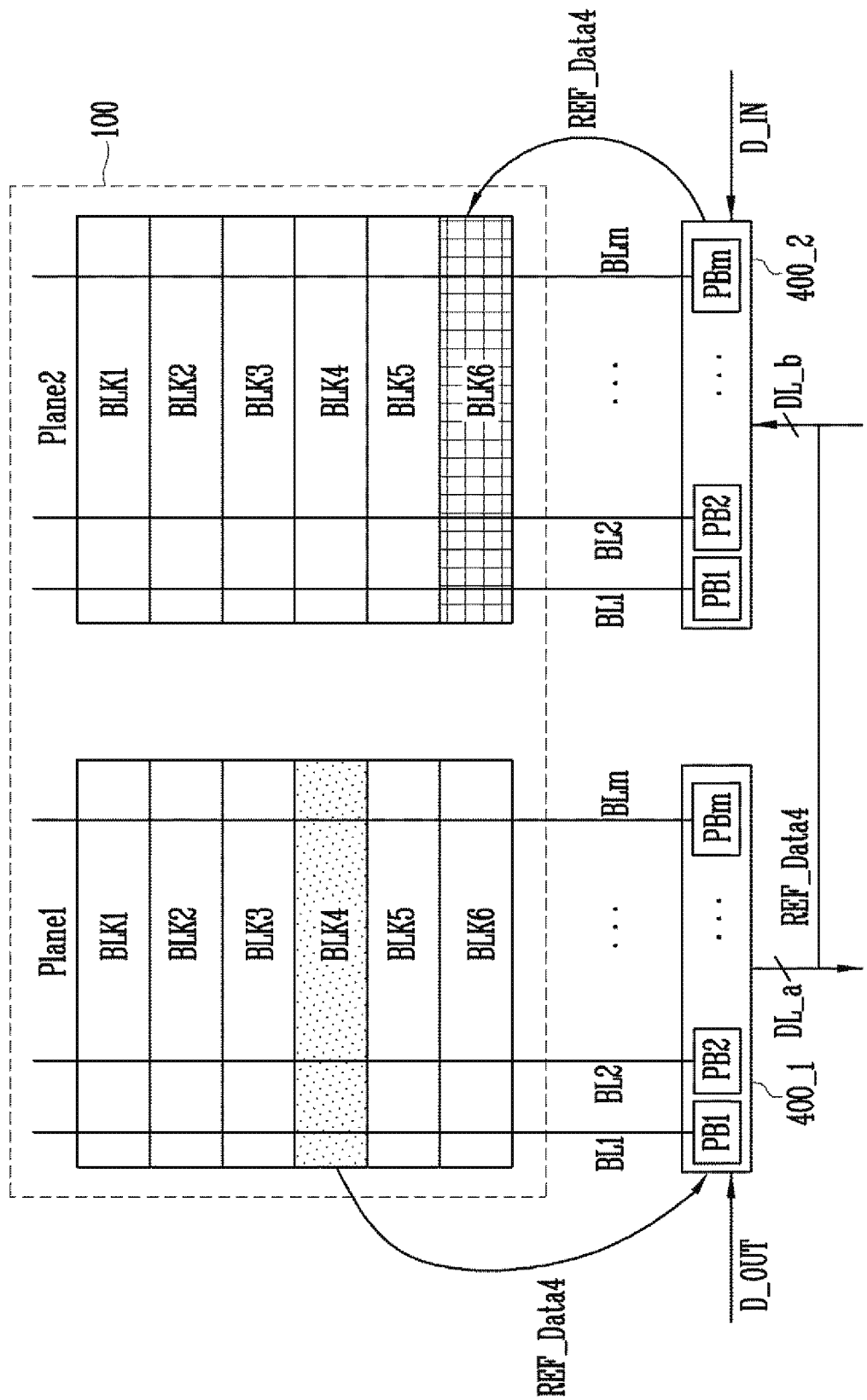
FIGS. 8 and 9 are diagrams for describing a refresh operation of a memory device including a plurality of planes.
Figure 9:
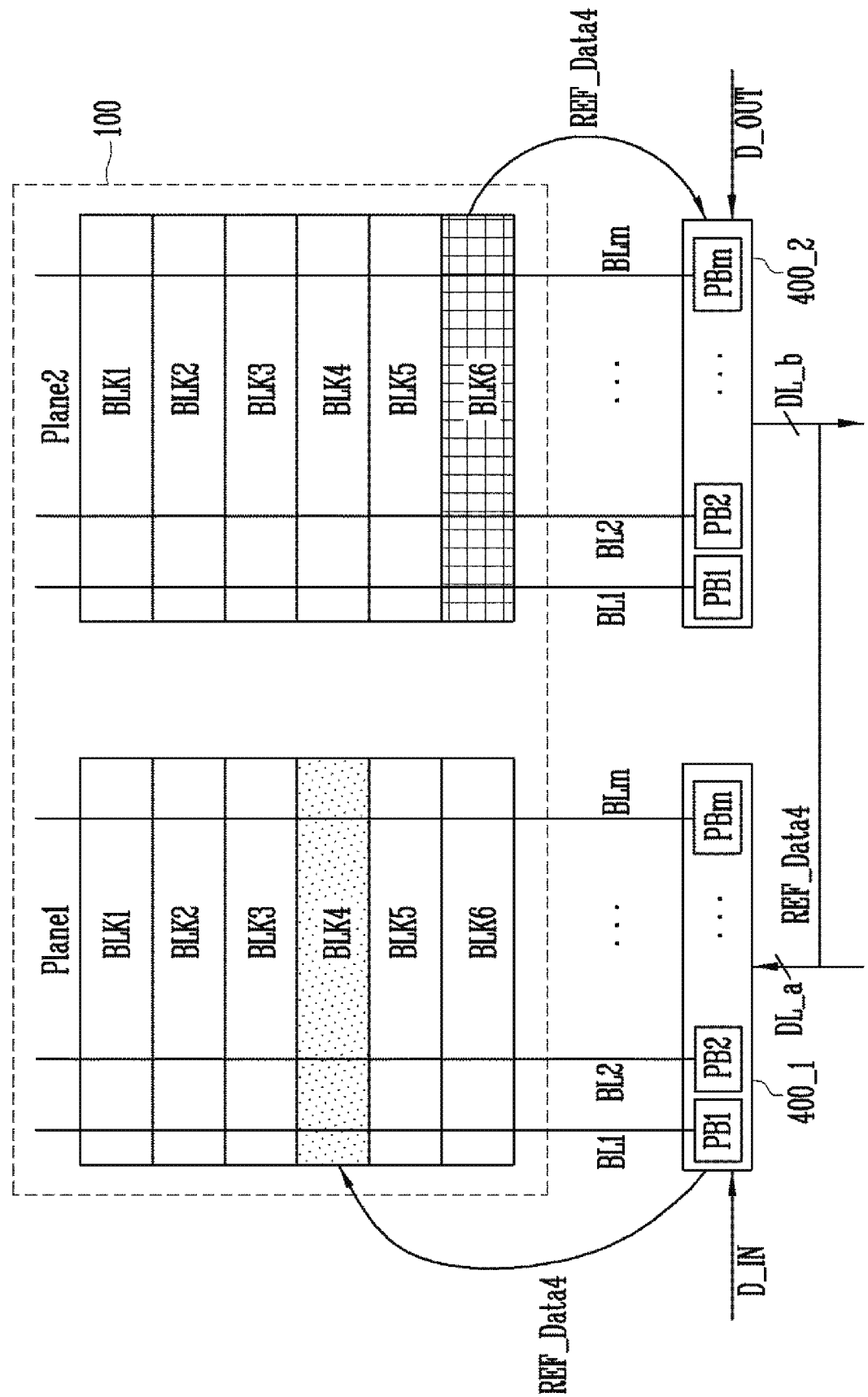

FIGS. 8 and 9 are diagrams for describing a refresh operation of a memory device including a plurality of planes.

Referring to FIG. 8, configurations of a memory cell array 100 including a plurality of planes Plane 1 and Plane 2 and temporary buffer circuits 400_1 and 400_2 is described before describing the refresh operation.

A first temporary buffer circuit 400_1 may be connected to a first plane Plane1 and the first temporary buffer circuit 400_1 may be selectively connected to all memory blocks BLK1 to BLK6 included in the first plane Plane1. The first temporary buffer circuit 400_1 may output data to first data lines DL_a in response to a data output signal D_OUT.

A second temporary buffer circuit 400_2 may be connected to a second plane Plane2 and the second temporary buffer circuit 400_2 may be selectively connected to all memory blocks BLK1 to BLK6 included in the second plane Plane2. The second temporary buffer circuit 400_2 may temporarily store data loaded in second data lines DL_b in response to a data input signal D_IN. The first data lines DL_a and the second data lines DL_b may be connected to each other.

In the above-described structure, the refresh operation is described as follows under an assumption that the fourth memory block BLK4 of the first plane Plaen1 is a target block T_BLK and the sixth memory block BLK6 of the second plane Plaen2 is a buffer block B_BLK.

Data REF_Data4 stored in the fourth memory block BLK4 of the first plane Plane1 may be transmitted to the first temporary buffer circuit 400_1. For example, when the data output signal D_OUT is input to the first temporary buffer circuit 400_1, the first temporary buffer circuit 400_1 may output the temporarily stored data REF_Data4 through the first data line DL_a.

Because the first data lines DL_a and the second data lines DL_b are connected to each other, the second temporary buffer circuit 400_2 may temporarily store the data REF_Data4 loaded in the second data lines DL_b in response to the data input signal D_IN.

The data REF_Data4 temporarily stored in the second temporary buffer circuit 400_2 may be programmed to the sixth memory block BLK6 corresponding to the buffer block B_BLK of the second plane Plane2.

Next, an erase operation of the fourth memory block BLK4 included in the first plane Plane1 may be performed.

Referring to FIG. 9, when the erase operation of the fourth memory block BLK4 included in the first plane Plane1 has ended, the data REF_Data4 programmed in the sixth memory block BLK6 of the second plane Plane2 may be copied back again to the fourth memory block BLK4 that is a target block of the first plane Plane1 through the second temporary buffer circuit 400_2, the second data lines DL_b, the first data lines DL_a and the first temporary buffer circuit 400_1.

When the data REF_Data4 is reprogrammed in the fourth memory block BLK4 of the first plane Plane1, an erase operation of the sixth memory block BLK6 corresponding to the buffer block B_BLK of the second plane Plane2 may be performed.

Figure 10:
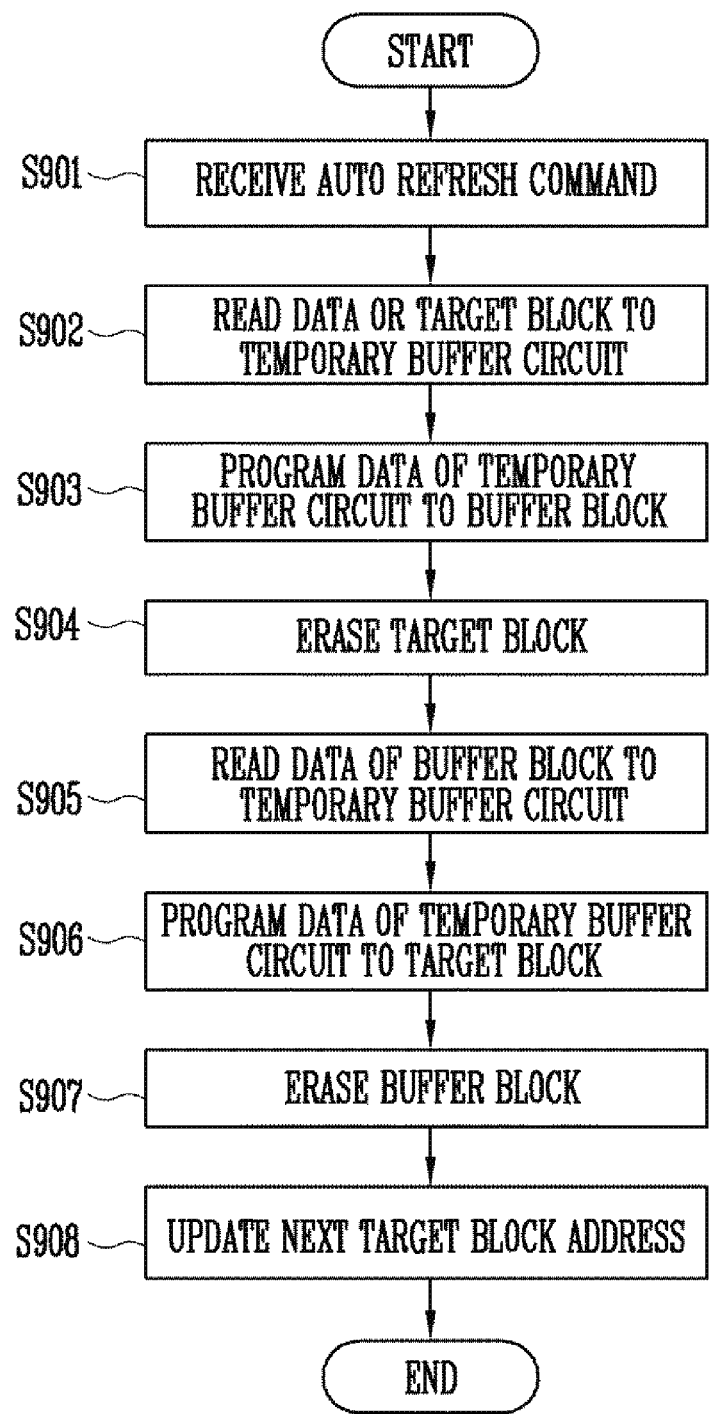
FIG. 10 is a diagram for specifically describing the refresh operation according to the first embodiment of the present disclosure.

FIG. 10 is a diagram for specifically describing the refresh operation according to the first embodiment of the present disclosure.

Referring to FIG. 10, because the refresh operation according to the first embodiment described above is an auto refresh operation, when the refresh operation of a selected target block is completed, the refresh operation may be ended without performing the refresh operation of the next block.

Therefore, the auto refresh operation may be performed as follows.

When an auto refresh command is received from a memory controller (S901), a memory device may read data of a target block to a temporary buffer circuit (S902). When the memory device is a non-volatile memory device, the read operation may be performed in a page unit of data included in the target block.

Next to step S902, the data stored in the temporary buffer circuit may be programmed to a buffer block (S903).

When the data is programmed to the buffer block (S903), an erase operation of the target block may be performed (S904).

Next to step S904, the data of the buffer block is read to the temporary buffer circuit and temporarily stored (S905), and the data of the temporary buffer circuit may be reprogrammed to the target block (S906).

When the data is reprogrammed to the target block, an erase operation of the buffer block may be performed for the refresh operation of the next target block (S907), and a next target block address may be updated (S908).

When the next target block address is updated, the refresh operation by the auto refresh command may be ended.

Figure 11:
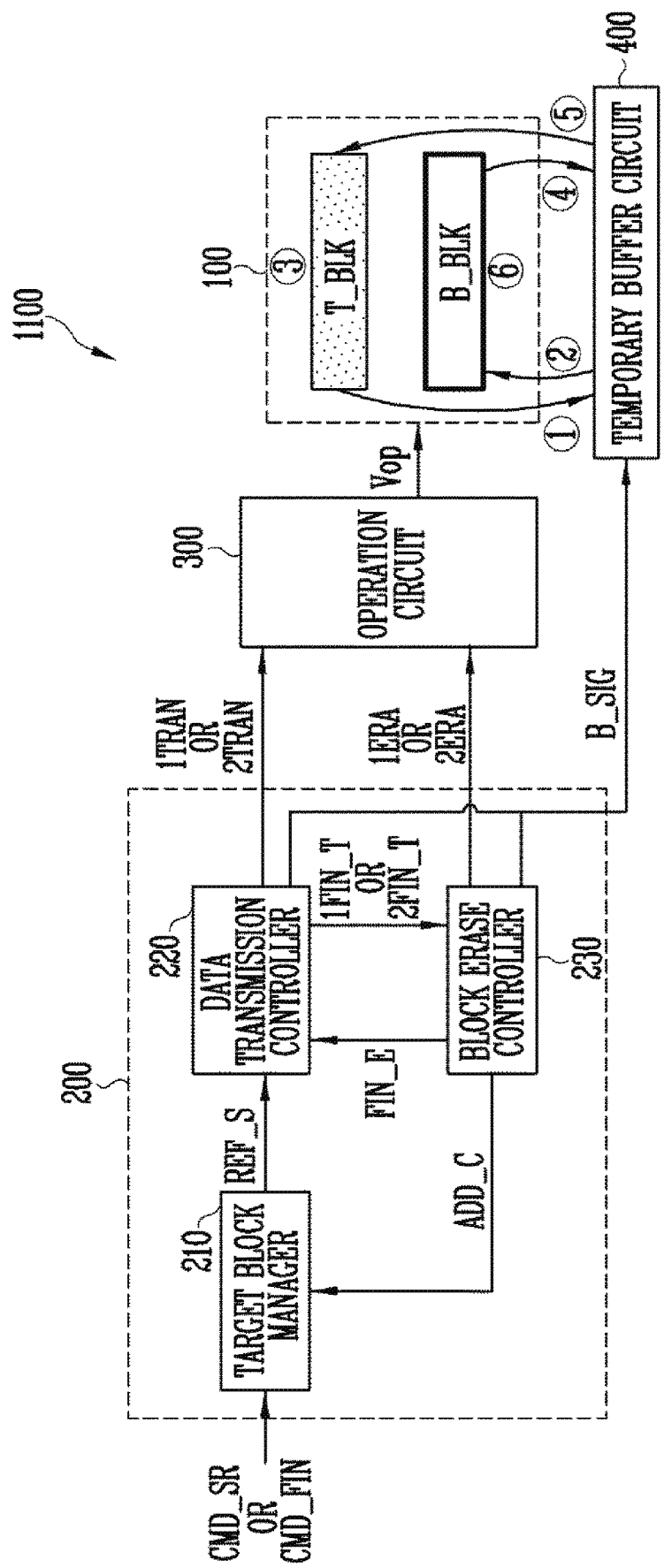
FIG. 11 is a diagram for specifically describing a memory device according to a second embodiment of the present disclosure.

FIG. 11 is a diagram for specifically describing a memory device according to a second embodiment of the present disclosure.

Referring to FIG. 11, the second embodiment shows a memory device 1100 capable of performing a refresh operation in response to a self refresh command CMD_SR. The self refresh operation may be performed while the memory device 1100 itself updates a target block address until a refresh end command CMD_FIN is received from a time at which the self refresh command CMD_SR is received.

In a configuration shown in FIG. 11, the remaining configurations except for a target block manager 210 are the same as those described above with reference to FIG. 4, and thus a repetitive description is omitted.

In the second embodiment, when the self refresh command CMD_SR is input, the target block manager 210 may output a refresh signal REF_S for starting the refresh operation of the target block T_BLK. When the refresh operation of the target block T_BLK is completed, the block erase controller 230 may output the address count signal ADD_C to the target block manager 210, and the target block manager 210 may update a target block address corresponding to the target block T_BLK on which the refresh operation is completed to an address corresponding to a target block on which the next refresh is performed.

When the refresh end command CMD_FIN is not received, the target block manager 210 may output the refresh signal REF_S to perform the refresh operation for the updated target block address.

The data transmission controller 220 and the block erase controller 230 may output the first or second transmission signal 1TRAN or 2TRAN, the first or second erase signal 1ERA or 2ERA, and the buffer control signal B_SIG to perform the refresh operation for the newly changed target block.

When the refresh end command CMD_FIN is received, the target block manager 210 may perform the refresh operation until the target block T_BLK in which the refresh operation is currently in progress, update the next target block address, and then end the refresh operation. For example, when receiving the refresh end command CMD_FIN, the target block manager 210 may update the target block address in response to the address count signal ADD_C and then might not output the refresh signal REF_S to end the self refresh operation.

Figure 12:
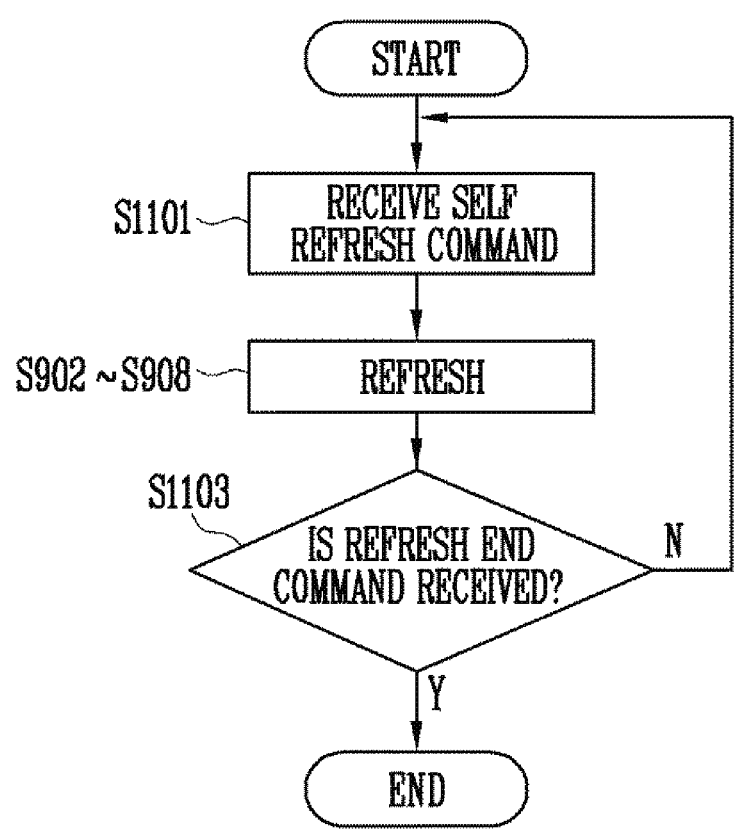
FIG. 12 is a diagram for specifically describing a refresh operation according to the second embodiment of the present disclosure.

FIG. 12 is a diagram for specifically describing the refresh operation according to the second embodiment of the present disclosure.

Referring to FIG. 12, when a self refresh command is received to the memory device (S1101), the memory device may perform a refresh operation for a target block. The refresh operation for the target block may be performed equally to steps S902 to S908 described above with reference to FIG. 10.

When the refresh operation of the target block has ended, the memory device may determine whether a refresh end command is received (S1103).

When the refresh end command is not received (N), the memory device may repeat steps S902 to S908 of FIG. 10 while changing the address of the target block.

When the refresh end command is received (Y), the memory device may end the self refresh operation.

Figure 13:
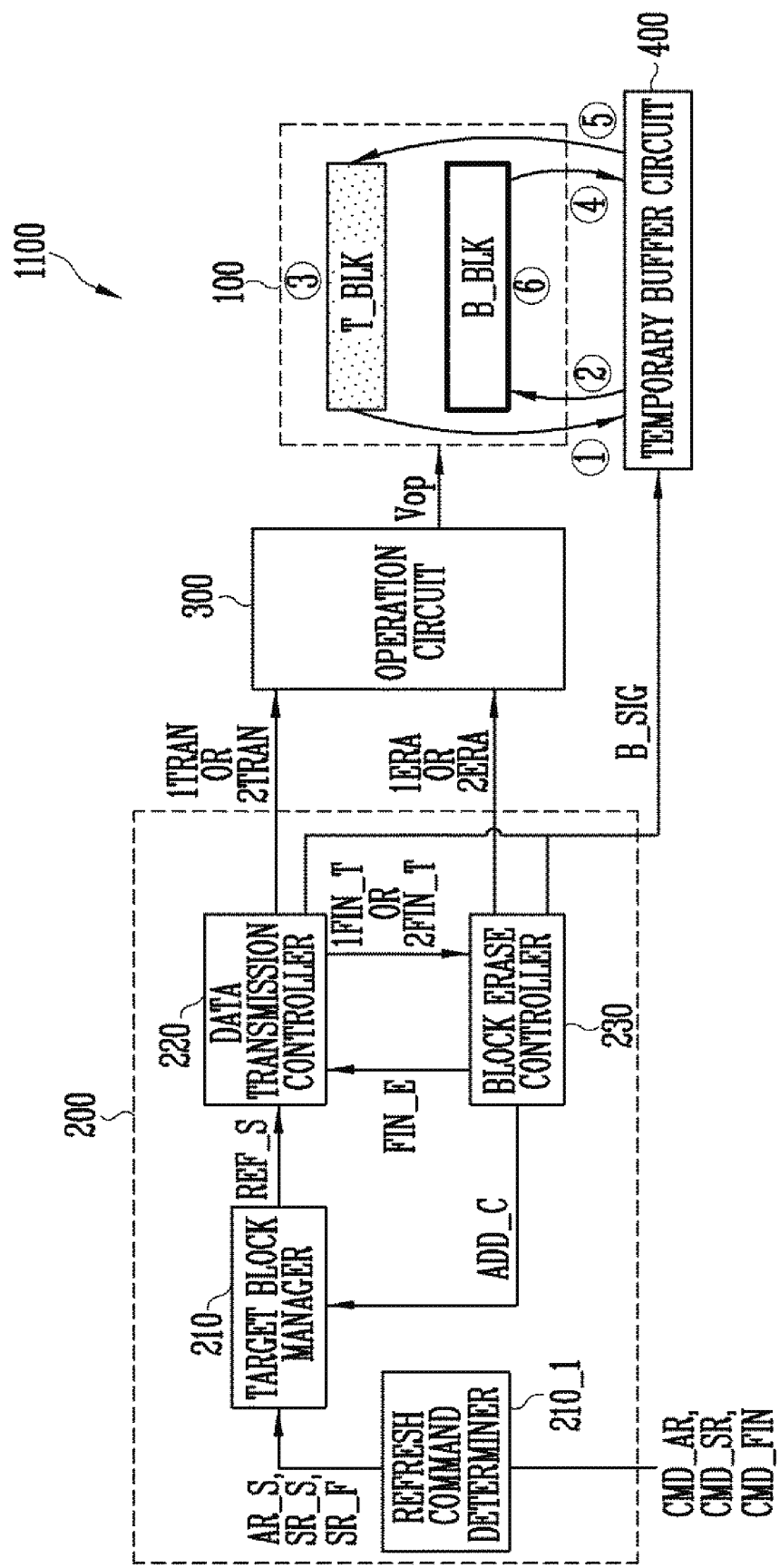
FIG. 13 is a diagram for specifically describing a memory device according to a third embodiment of the present disclosure.

FIG. 13 is a diagram for specifically describing a memory device according to a third embodiment of the present disclosure.

Referring to FIG. 13, the third embodiment shows a memory device 1100 capable of supporting both of the auto refresh operation and the self refresh operation described in the first and second embodiments.

In a configuration shown in FIG. 13, the remaining configurations except for a refresh command determiner 210_1 and a target block manager 210 are the same as those described above with reference to FIG. 4 or 11, and thus a repetitive description is omitted.

In the third embodiment, the refresh command determiner 210_1 may output different signals in accordance with input refresh related commands. For example, the refresh command determiner 210_1 may output an auto refresh signal AR_S when the auto refresh command CMD_AR is input, may output a self refresh signal when the self refresh command CMD_SR is output, and may output the self refresh end signal SR_F when the refresh end command CMD_FIN is input.

Because the target block manager 210 is used to distinguish the auto refresh signal AR_S, the self refresh signal SR_S, and the self refresh end signal SR_F, the auto refresh signal AR_S, the self refresh signal SR_S, and the self refresh end signal SR_F may be output through different lines connected between the refresh command determiner 210_1 and the target block manager 210.

When the auto refresh signal AR_S is input, the target block manager 210 may output the refresh signal REF_S for performing the refresh operation of the target block T_BLK. When the refresh signal REF_S is output in response to the auto refresh signal AR_S, the target block manager 210 may update the target block address in response to the address count signal ADD_C, and then end the refresh operation without outputting the refresh signal REF_S.

When the self refresh signal SR_S is input, the target block manager 210 may output the refresh signal REF_S for performing the refresh operation of the target block T_BLK. When the refresh signal REF_S is output in response to the self refresh signal SR_S, the target block manager 210 may update the target block address in response to the address count signal ADD_C and then continue the refresh operation by repeatedly outputting the refresh signal REF_S.

When the self refresh end signal SR_F is input, the target block manager 210 may update the target block address and then end the self refresh operation without outputting the refresh signal REF_S.

When the memory device is implemented by a non-volatile memory device, because the non-volatile memory device operates in a page unit, the refresh operation may also be performed in a page unit. A method of performing the refresh operation in a page unit is specifically described as follows.

Figure 14:
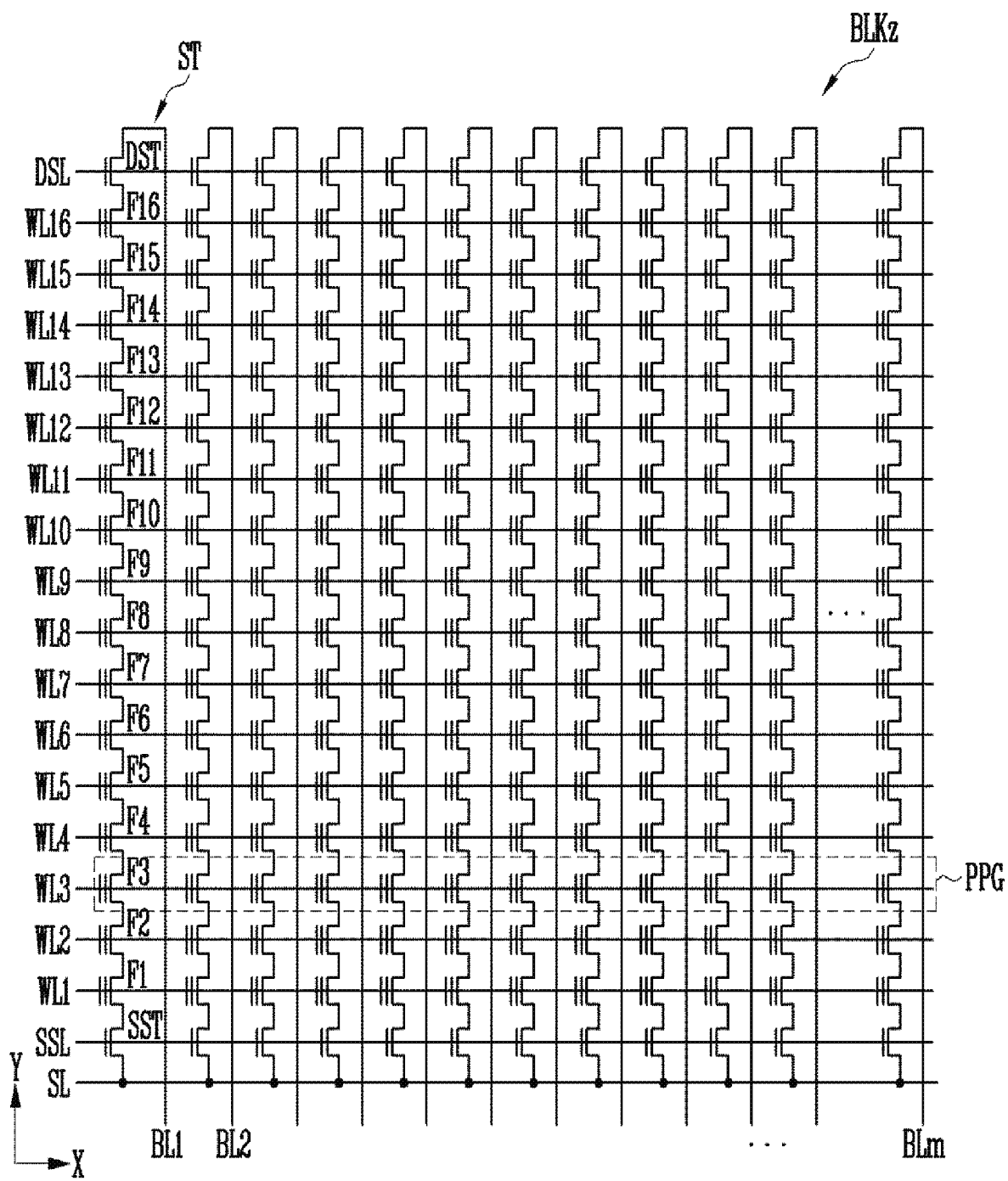
FIG. 14 is a diagram for specifically describing a configuration of a memory block.

FIG. 14 is a diagram for specifically describing a configuration of a memory block.

Referring to FIG. 14, a first select line, word lines, and a second select line arranged in parallel with each other may be connected to the memory block BLKz. For example, the word lines may be arranged in parallel to each other between the first and second select lines. Here, the first select line may be a source select line SSL, and the second select line may be a drain select line DSL.

More specifically, the memory block BLKz may include a plurality of strings ST connected between bit lines BL1 to BLm and a source line SL. The bit lines BL1 to BLm may be connected to the strings ST, respectively, and the source line SL may be commonly connected to the strings ST. Because the strings ST may be configured to be identical to each other, a string ST connected to the first bit line BL1 is specifically described as an example.

The string ST may include a source select transistor SST, a plurality of memory cells F1 to F16, and a drain select transistor DST connected in series between the source line SL and the first bit line BL1. One string ST may include at least one of the source select transistor SST and the drain select transistor DST and memory cells of which the number of is greater than the number of the memory cells F1 to F16 shown in the figure may also be included in the string ST.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of the source select transistors SST included in different strings ST may be connected to the source select line SSL and gates of the drain select transistors DST may be connected to the drain select line DSL, and gates of the memory cells F1 to F16 may be connected to a plurality of word lines WL1 to WL16. A group of memory cells connected to the same word line among the memory cells included in the different strings ST may be referred to as a physical page PPG. Therefore, the physical block PPG as many as the number of the word lines WL1 to WL16 may be included in the memory block BLKz.

One memory cell may store one bit of data. This is commonly referred to as a single-level cell (SLC) method. In this case, one physical page PPG may store one logical page of data. One logical page of data may include as many data bits as the number of memory cells included in one physical page PPG. Alternatively, one memory cell may store two or more bits of data. In this case, one physical page PPG may store two or more logical pages of data. A method in which two bits of data are stored in one memory cell is referred to as a multi-level cell (MLC) method. Recently, as the number of bits of data stored in one memory cell increases, a method in which three bits of data are stored in one memory cell is referred to as a triple-level cell (TLC) method, and a method in which four bits of data are stored in one memory cell is referred to as a quadruple-level cell (QLC) method. In addition, a memory cell method in which a plurality of bits of data are stored is being developed.

Because a method in which two bits of data are stored in one memory cell has been widely used in recent years, a refresh operation of a memory device driven by a triple-level cell (TLC) method is described as an example in a fourth embodiment described below.

Figure 15:
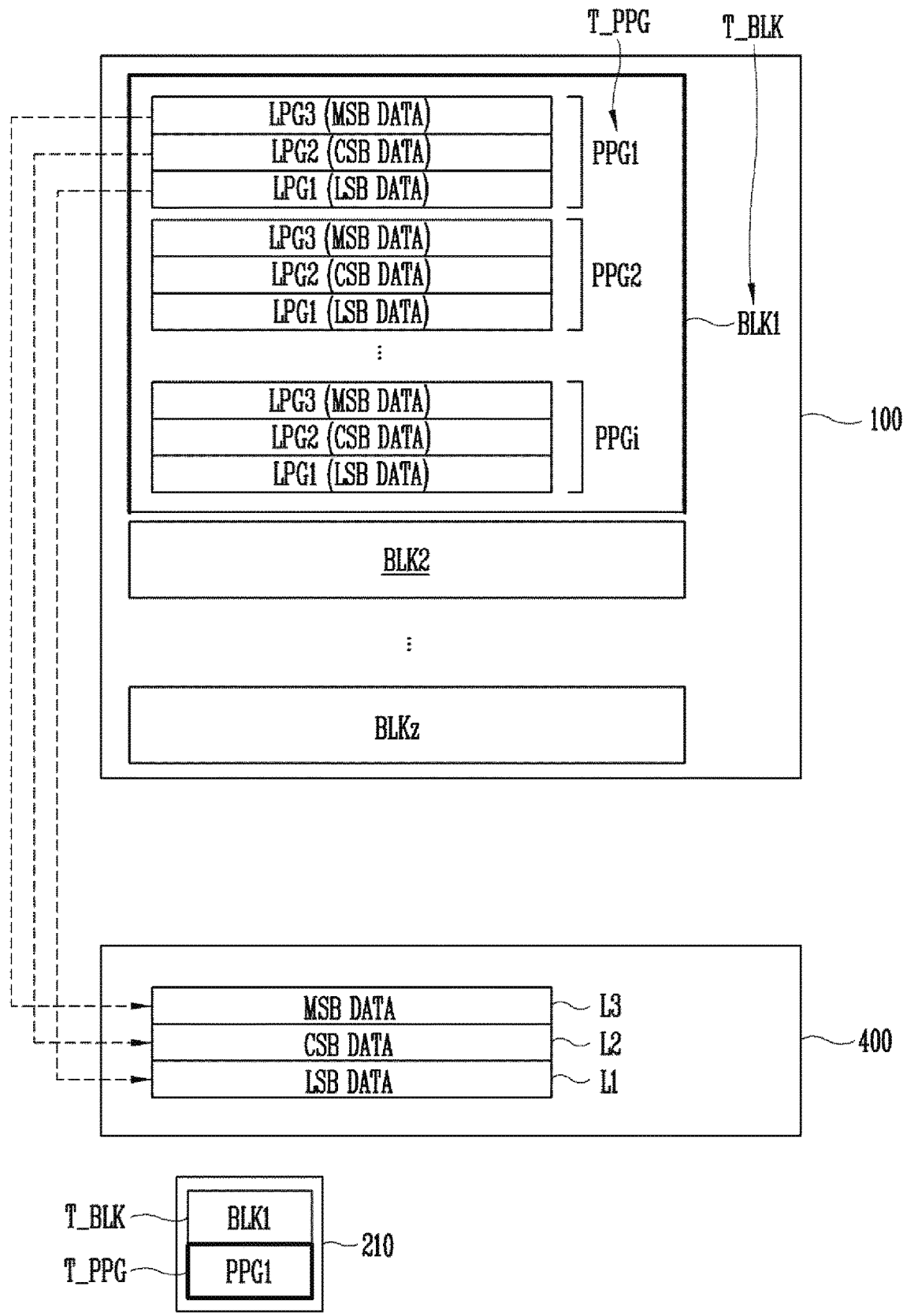
FIGS. 15 and 16 are diagrams for describing a refresh operation according to a fourth embodiment of the present disclosure.
Figure 16:
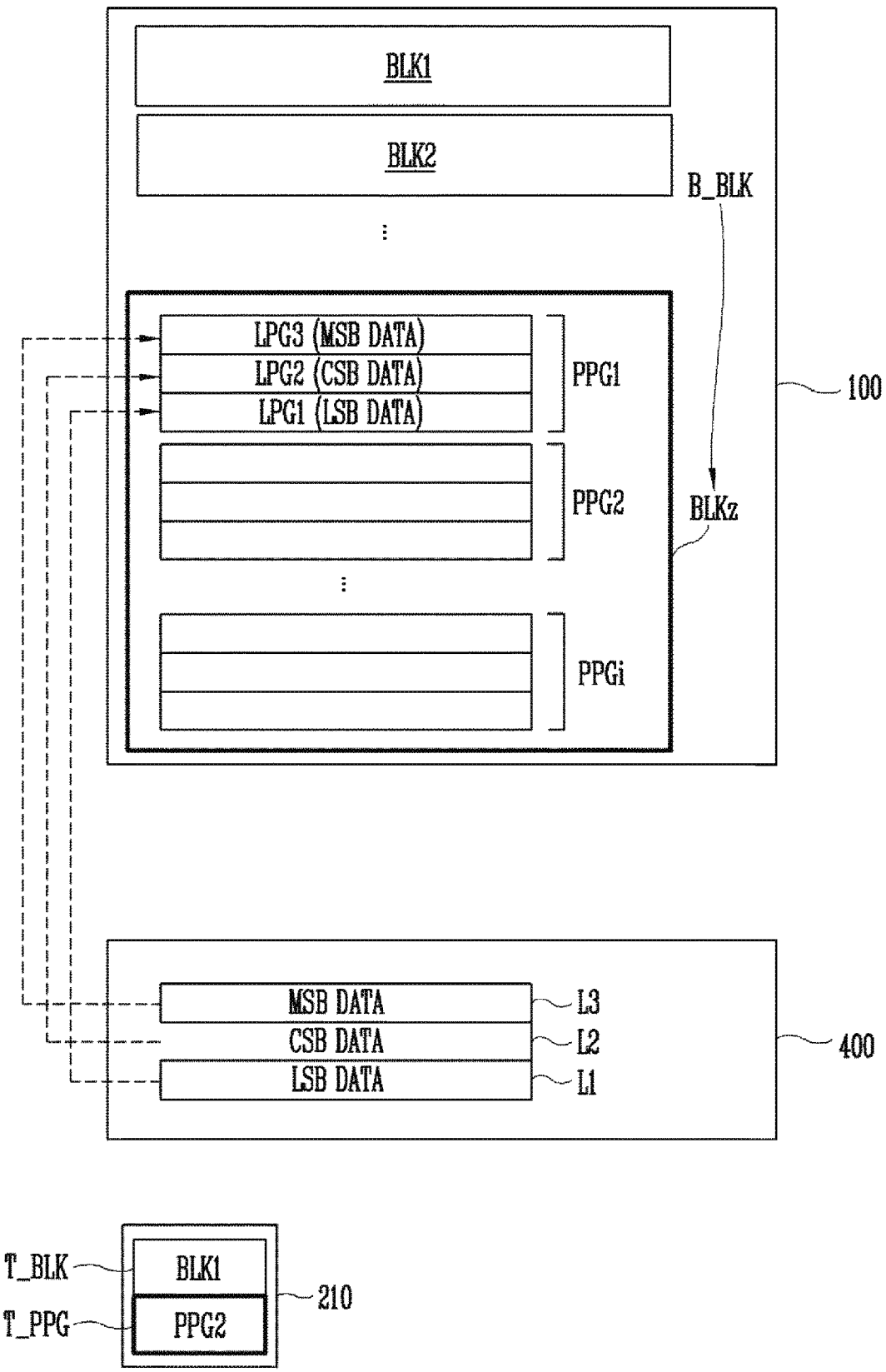

FIGS. 15 and 16 are diagrams for describing the refresh operation according to the fourth embodiment of the present disclosure. It is assumed that a first memory block BLK1 is a target block T_BLK and a z-th memory block BLKz is a buffer block B_BLK.

Referring to FIG. 15, in the case of a memory device driven by a triple-level cell (TLC) method, three pieces of logical page data may be stored in each of physical pages PPG1 to PPGi included in the target block T_BLK. For example, first logical page data LPG1 may be least significant bit (LSB) data, second logical page data LPG2 may be center significant bit (CSB) data, third logical page data LPG3 may be most significant bit (MSB) data.

During the refresh operation, because the first to third logical page data LPG1 to LPG3 are required to be respectively maintained, a temporary buffer circuit 400 may include at least three latches L1 to L3 for storing the first to third logical page data LPG1 to LPG3. For example, each of page buffers included in the temporary buffer circuit 400 may include at least three latches L1 to L3.

During the refresh operation, the first logical page data LPG1 stored in the first physical page PPG1 may be transmitted to the first latch L1 of the temporary buffer circuit 400, the second logical page data LPG2 stored in the first physical page PPG1 may be transmitted to the second latch L2 of the temporary buffer circuit 400, and the third logical page data LPG3 stored in the first physical page PPG1 may be transmitted to the third latch L3 of the temporary buffer circuit 400.

At this time, the target block T_BLK that is a target of the refresh operation, and an address of the first physical page PPG1 included in the target block T_BLK may be stored in a target block manager 210. For example, an address of the target block T_BLK does not change until the refresh operation of all the physical pages PPG1 to PPGi included in the target block T_BLK is completed.

Referring to FIG. 16, when the first to third logical page data LPG1 to LPG3 stored in the first physical page PPG1 are stored in the first to third latches L1 to L3 of the temporary buffer circuit 400, respectively, the first to third logical page data LPG1 to LPG3 stored in the first to third latches L1 to L3 of the temporary buffer circuit 400 may be programmed in the first physical page PPG1 of the block BLKz selected as the buffer block B_BLK.

When all the first to third logical page data LPG1 to LPG3 are programmed in the first physical page PPG1 of the buffer block B_BLK, an address of a target page T_PPG of the target block manager 210 may be updated to an address of the second physical page PPG2 that is a physical page on which the next refresh is to be performed.

In such a method, when data of all the physical pages PPG1 to PPGi included in the target block T_BLK is copied back to the buffer block B_BLK, an erase operation of the target block T_BLK may be performed.

An operation of transmitting the data of the buffer block B_BLK to the target block T_BLK may also be performed in units of logical pages stored in each physical page. When all the data of the buffer block B_BLK are transmitted to the target block T_BLK and the buffer block B_BLK is erased, the address of the target block T_BLK stored in the target block manager 210 may be updated to an address of a block on which the next refresh is to be performed.

FIGS. 17 to 21 are diagrams for describing a refresh operation according to a fifth embodiment of the present disclosure.

Figure 17:
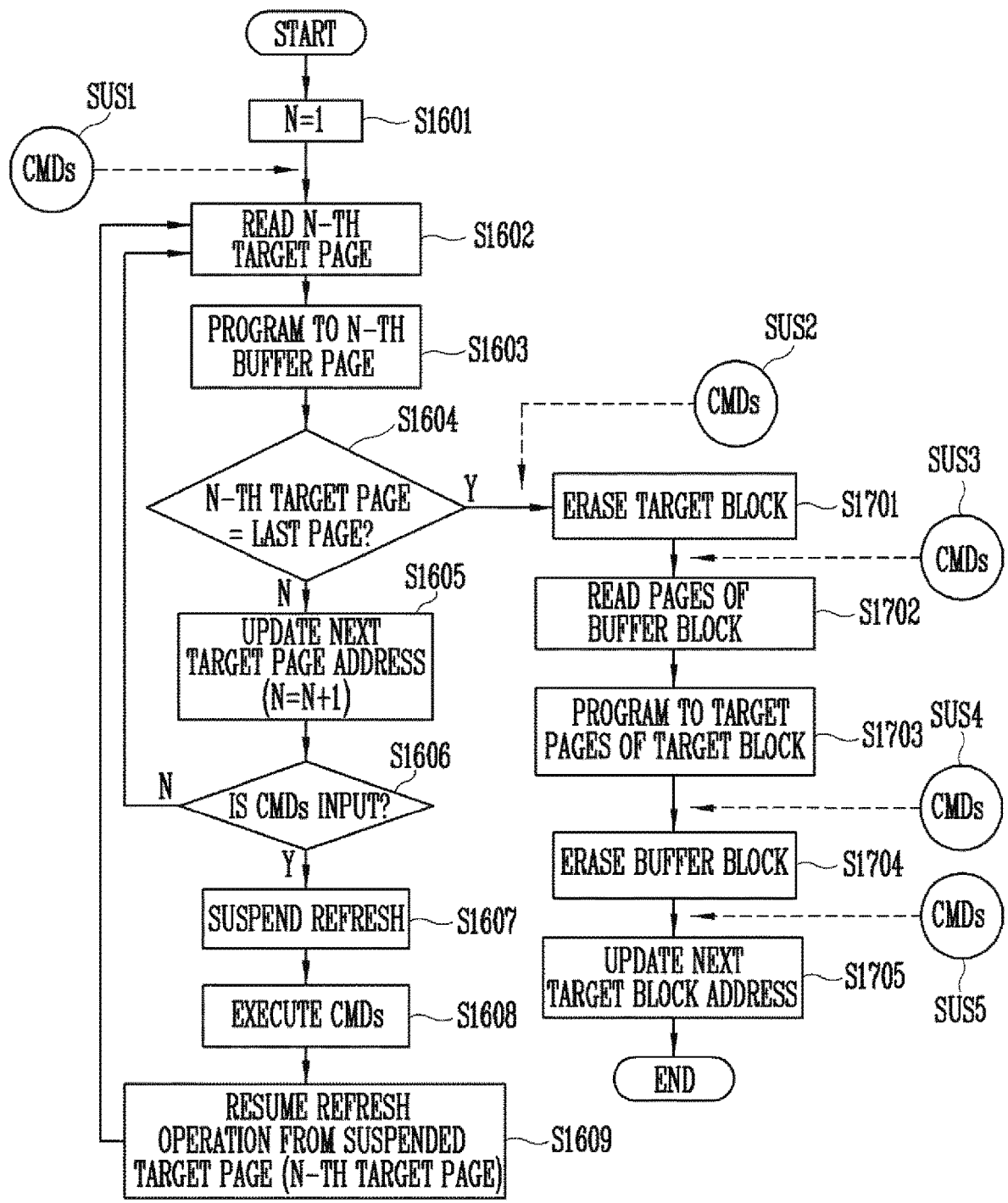
FIGS. 17 to 21 are diagrams for describing a refresh operation according to a fifth embodiment of the present disclosure.

Referring to FIG. 17, FIG. 17 shows an operation method in a case in which a suspend command CMDs is received during a refresh operation of a target block.

The suspend command CMDs may be a command received from a memory controller during an operation of a memory device and may be a command that is required to be executed prior to an operation that is currently in progress in the memory device. Therefore, when the suspend command CMDs is received while the refresh operation is being performed in the memory device, the refresh operation is temporarily suspended, and the suspend command CMDs may be executed. When the operation corresponding to the suspend command CMDs has ended, the suspended refresh operation may be resumed. In the fifth embodiment, a target page in which the refresh operation is completed may be managed so that the refresh operation may be resumed from a physical page where the refresh operation is suspended. The fifth embodiment is specifically described as follows.

When the refresh operation of the target block is started, N (N is a positive integer) corresponding to an address of the physical page may be set to 1 as an initial value (S1601).

A read operation of an N-th target page included in the target block may be performed (S1602), and the data read from the N-th target page may be programmed in an N-th buffer page of a buffer block (S1603). Here, the N-th target page means a physical page selected for the refresh operation from a plurality of physical pages included in the target block, and the N-th buffer page means a physical page selected to temporarily store data of the target page among a plurality of physical pages included in the buffer block.

Next, determining whether the N-th target page is the last page of the physical pages included in the target block may be performed (S1604).

When the N-th target page is the last page (Y), because data of all the physical pages of the target block are copied to the buffer block, an erase operation of the target block may be performed (S1701).

When the target block is erased, the buffer pages included in the buffer block may be read (S1702), and the read data may be reprogrammed to the target pages of the target block (S1703).

Next, the erase operation of the buffer block is performed for the next refresh operation (S1704), and an address of the next target block may be updated (S1705).

The above-described steps S1601 to S1604 and S1701 to S1705 may be performed similarly to the refresh operation described in the first to fourth embodiments.

In step S1604, when the N-th target page is not the last page in the target block (N), an address of the next physical page included in the target block may be updated to an address of the next target page (S1605). That is, in step S1605, when all data of the selected target page are transmitted to the selected buffer page, a copy-back progress state of the physical pages may be stored in real time by updating the address of the physical page that is a data transmission target to the address of the next physical page.

Determining whether a suspend command CMDs is input may be performed (S1606).

When the suspend command CMDs is not input (N), steps S1602 to S1606 may be repeated while the address of the target page is updated.

When the refresh operation of the target block is completed while steps S1602 to S1606 are repeated, the refresh operation may be ended. However, when the suspend command CMDs is input before the refresh operation of the target block is completed, the refresh operation that is currently performed may be temporarily suspended (S1607).

When the refresh operation is suspended, the input suspend command CMDs may be executed (S1608).

When the operation corresponding to the suspend command CMDs has ended, the memory device may resume the refresh operation from the target page where the refresh operation is suspended according to an address of a target page which is finally stored (S1609). For example, because the address of the target page which is finally stored is an address of the physical page of which the copy back operation is not completed, a read operation may be performed again from a page corresponding to a stored address of a physical page (S1602).

Because the read operation may be performed again from the physical page of which the address is stored even though the refresh operation is temporarily suspended, by storing the address of the next physical page every time the physical pages are copied back as described above, a time during which read and program operations of the physical pages on which the copy back operation is completed in advance in the target block are performed again may be shortened.

Step S1606 of checking whether the suspend command CMDs is input may be performed at any time during the execution of the refresh operation, and need not be specifically performed immediately after step S1605 as shown. For example, step SUS1 of checking whether the suspend command CMDs is input may be performed before the refresh operation is started and step S1602 of reading a first target page is performed. In this case, when it is determined that the suspend command CMDs is input, the refresh operation is temporarily suspended, and an operation corresponding to the suspend command CMDs may be performed. When the operation corresponding to the suspend command CMDs is completed, the suspended refresh operation is resumed and step S1602 may be performed. When it is determined in step SUS1 that the suspend command is not input, step S1602 may be performed. As described above, steps SUS2 to SUS5 for confirming whether the suspend command CMDs is input may be performed at any time during the refresh operation.

That is, during the copy back of the pages as in step S1606, the refresh operation may be temporarily suspended and the suspend command CMDs may be executed. However, at a time at which the refresh operation is started or before or after the block erase operation is performed, when suspend command CMDs is executed as in steps SUS1 to SUS5, an operation time may be further shortened. For example, when the suspend command CMDs is executed during the copy back of pages (in a case of step S1606), addresses of a memory block and a page where the copy back operation is suspended are required to be stored. However, when the suspend command CMDs is executed before or after the block erase operation is performed, because only the address of the memory block is stored, the operation time may be shortened.

An operation method according to the fifth embodiment is described with reference to one physical page as an example as follows.

Figure 18:
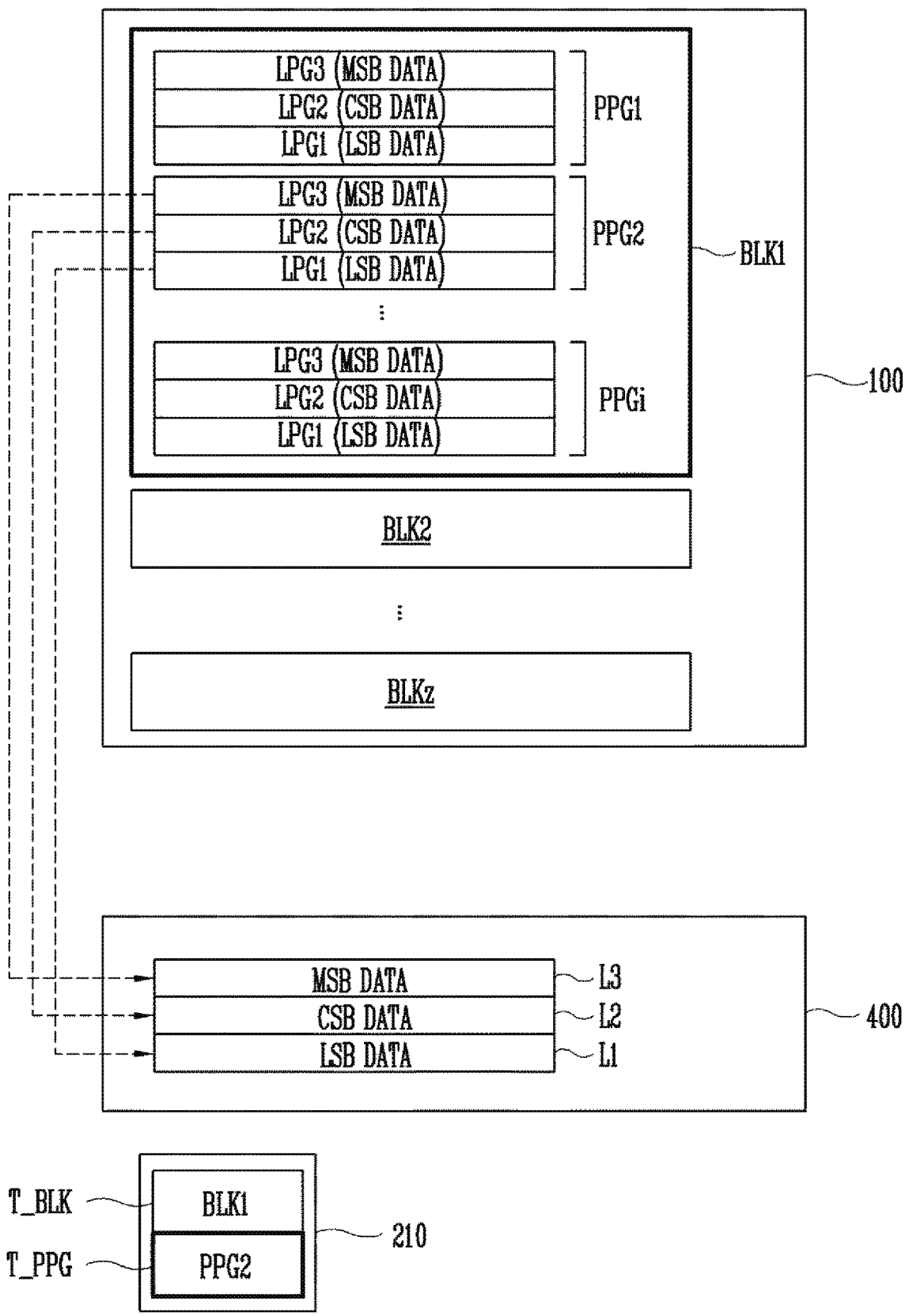

Referring to FIG. 18, a first memory block BLK1 is a target block, and a read operation for copying back data of a second physical page PPG2 to a buffer block may be performed. Assuming that the copy back operation is performed in an order of an address of a physical page, a fact that the read operation of the second physical page PPG2 is performed means that the copy back operation of a first physical page PPG1 is completed. Therefore, an address of the first memory block BLK1 corresponding to a target block T_BLK and an address of the second physical page PPG2 as a target page T_PPG that is a copy back target may be stored in a target block manager 210.

Figure 19:
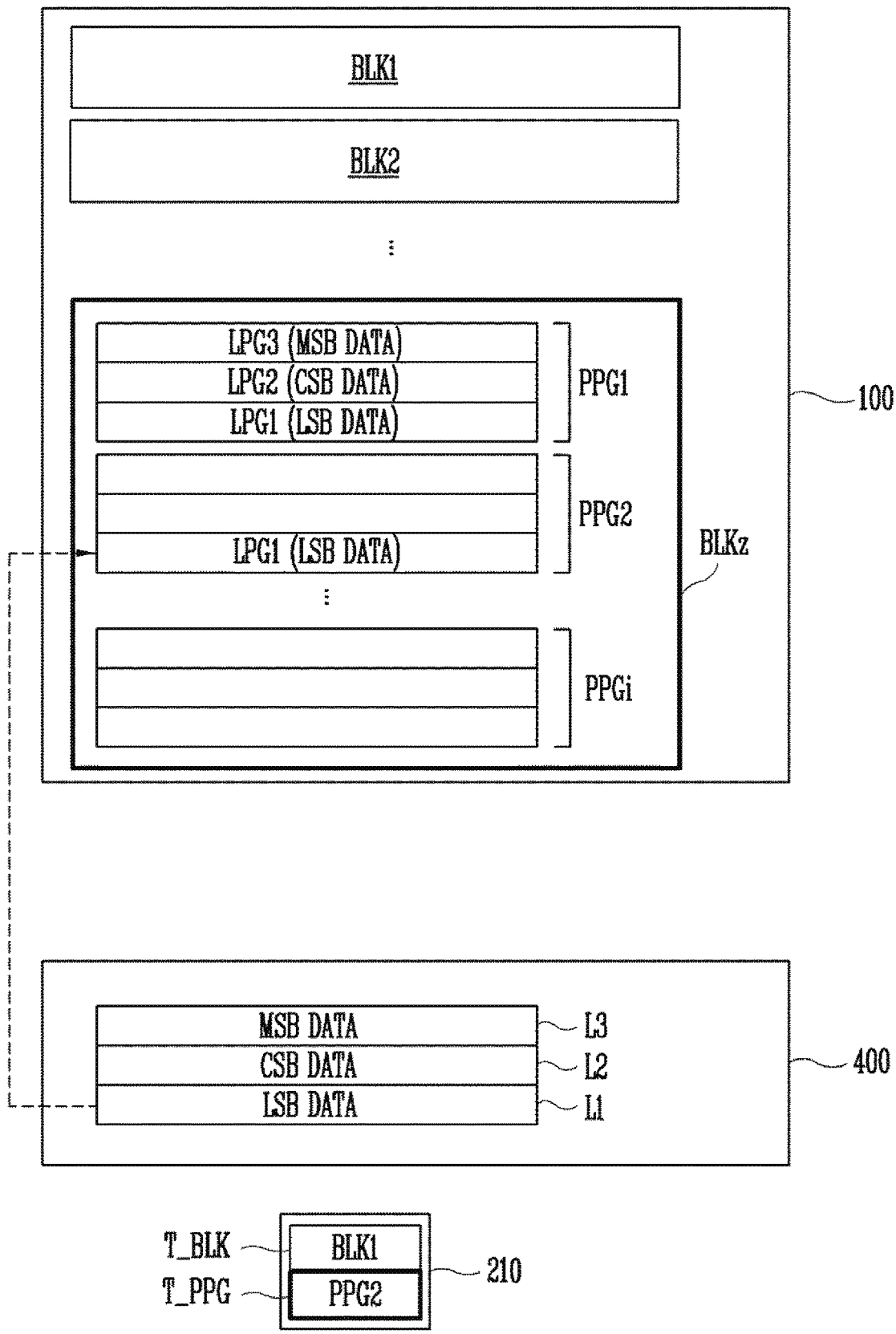

Referring to FIG. 19, when all first to third logical page data LPG1 to LPG3 stored in the second physical page PPG2 of the first memory block BLK1 are transmitted to first to third latches L1 to L3 of a temporary buffer circuit 400, the logical page data stored in the first to third latches L1 to L3 may be respectively programmed to the second physical page PPG2 of a z-th memory block BLKz.

When a suspend command is input while the first logical page data LPG1 is programmed to the second physical page PPG2 of the z-th memory block BLKz, a program operation for the second physical page PPG2 of the z-th memory block BLKz is temporarily suspended, and an operation corresponding to the suspend command may be performed. At this time, because all of the first to third logical page data LPG1 to LPG3 are not copied back to the second physical page PPG2 of the z-th memory block BLKz, an address of the target page T_BLK stored in a target block manager 210 may be maintained as the first memory block BLK1 and an address of a target page T_PPG may be maintained as the second physical page PPG2.

Figure 20:
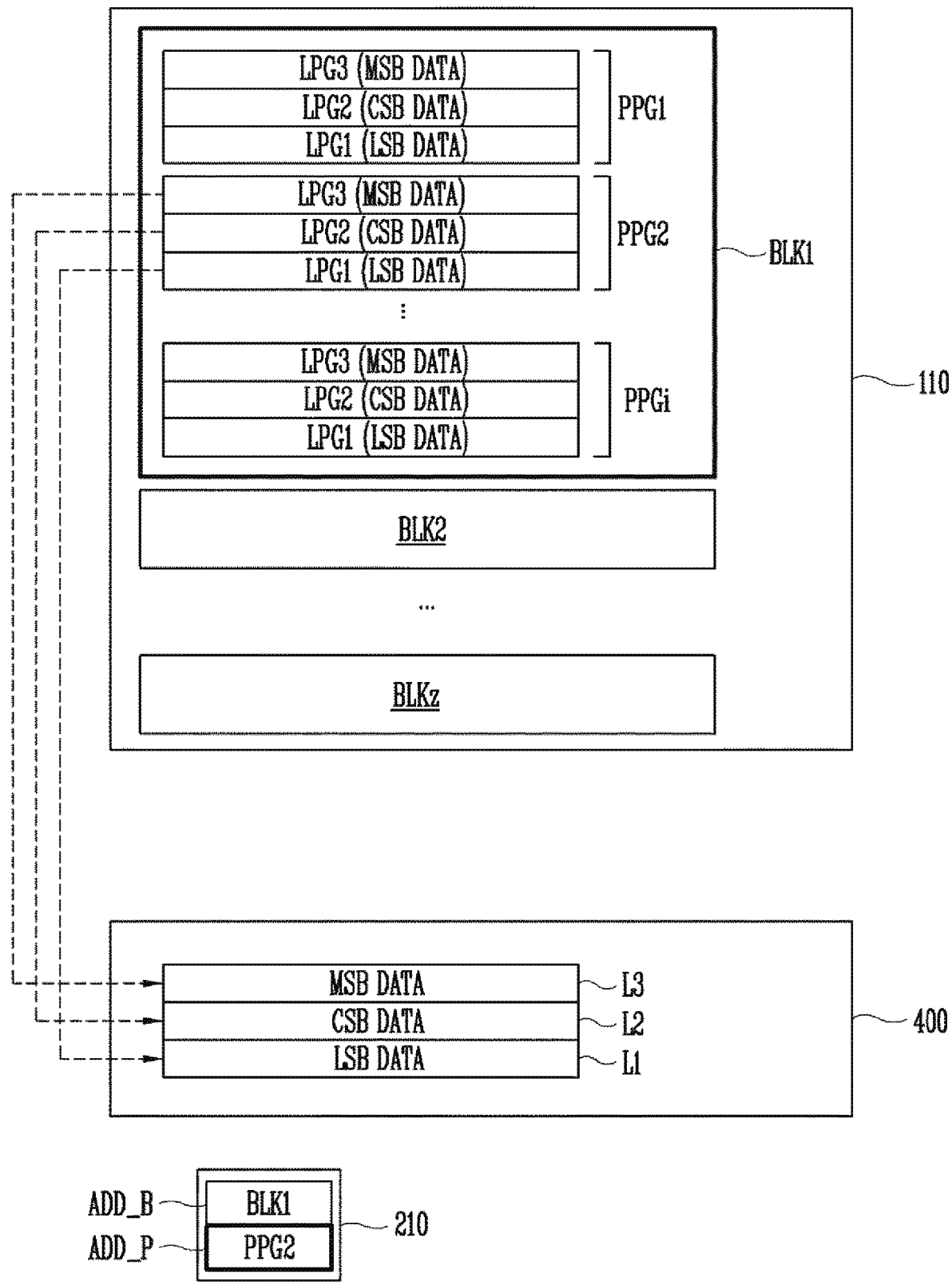

Referring to FIG. 20, when the operation corresponding to the suspend command has ended, the memory device may resume from the a read operation of the second physical page PPG2 of the first memory block BLK1 according to the addresses of the target block T_BLK and the target page T_PPG stored in the target block manager 210. That is, because the first physical page PPG1 of the first memory block BLK1 is copied back to the first physical page PPG1 of the z-th memory block BLKz in advance, duplicate performance of the copy back operation of the first physical page PPG1 may be prevented.

Figure 21:
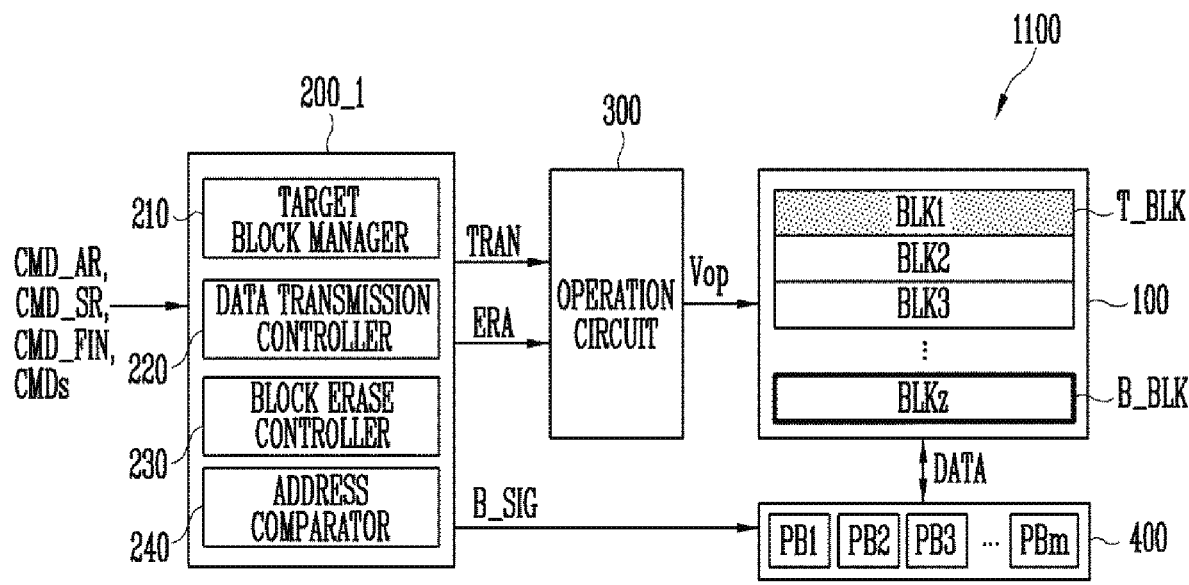

Referring to FIG. 21, because a suspend command for the same block as a target block on which a refresh operation is being performed may be input, a control logic 200_1 may further include an address comparator that compares a block address on which a refresh operation is current being performed with a block address input together with the suspend command.

For example, the address comparator 240 may output a result of an address comparison according to a type of the suspend command, and a target block manager 210 may determine whether to completely end the refresh operation of the target block on which the refresh operation is currently being performed or to resume the refresh operation on the same target block after performing a suspend operation, according to the result output from the address comparator 240.

Figure 22:
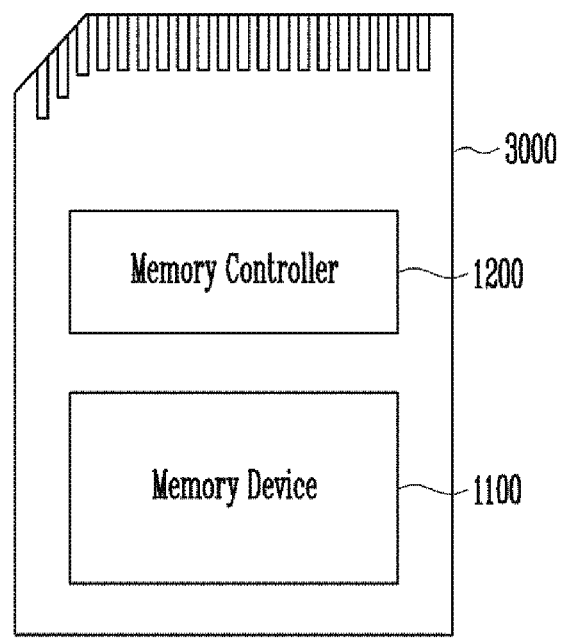
FIG. 22 is a block diagram for describing a memory card system to which a memory device and a memory controller of the present disclosure are applied.

FIG. 22 is a block diagram for describing a memory card system to which a memory device and a memory controller of the present disclosure are applied.

Referring to FIG. 22, the memory card system 3000 may include a memory controller 1200 and a memory device 1100.

The memory controller 1200 is connected to the memory device 1100. The memory controller 1200 is configured to access the memory device 1100. For example, the memory controller 1200 is configured to control read, erase, and background operations of the memory device 1100. The memory controller 1200 is configured to provide an interface between the memory device 1100 and a host Host. The memory controller 1200 is configured to drive firmware for controlling the memory device 1100. The memory device 1100 may be implemented equally to the memory device 1100 described with reference to FIG. 4, 11, 13, or 21.

The memory controller 1200 may output an auto refresh command, a self refresh command, or a refresh end command to the memory device 1100 as in the first to fifth embodiments described above, and may output a suspend command according to a request of the host.

The memory card system 3000 may communicate with an external device (for example, the host) according to a specific communication standard. As an example, the memory controller 1200 included in the memory card system 3000 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

As an example, the memory device 1100 may be implemented as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 1200 and the memory device 1100 may be integrated into one semiconductor device to configure a memory card. For example, the memory controller 1200 and the memory device 1100 may be integrated into a one semiconductor device to configure a memory card such as a PC card (personal computer memory card international association (PCMCIA)), a compact flash card (CF), a smart media card (SM or SMC), a memory stick, a multimedia card (MMC, RS-MMC, MMC micro, or eMMC), an SD card (SD, miniSD, microSD, or SDHC), and a universal flash storage (UFS).

Although the detailed description of the present disclosure describes specific embodiments, various changes and modifications may be made to these embodiments without departing from the scope and technical spirit of the present disclosure. Therefore, the scope of the present disclosure should not be limited to the above-described embodiments, and should be determined by the equivalents of the claims of the present disclosure as well as the following claims.

Although the present disclosure has been described with reference to a limited number of possible embodiments and drawings, the present disclosure is not limited to the embodiments described above, and various changes and modifications may be made to the disclosed description by those skilled in the art to which the present disclosure pertains.

Therefore, the scope of the present disclosure should not be limited to the described embodiments, and should be determined by the equivalents of the claims as well as the following claims.

In the embodiments described above, all of the steps may optionally be performed or omitted. In addition, the steps in each embodiment need not occur in the presented order, and may be reversed. Meanwhile, the embodiments of the present disclosure disclosed in the present specification and the drawings are merely specific examples for easily describing the technical content of the present specification and facilitating understanding of the present specification and do not limit the scope of the present specification. That is, it is apparent to those skilled in the art to which the present disclosure pertains that other modification examples based on the technical spirit of the present disclosure are possible.

Meanwhile, the present specification and drawings disclose a preferred embodiment of the present disclosure. Although specific terms are used, they are used in general meaning for purposes of easily describing technical content of the present disclosure and facilitating understanding of the present disclosure, and are not intended to limit the scope of the present disclosure. It is apparent to those skilled in the art to which the present disclosure pertains that other modification examples based on the technical spirit of the present disclosure may be carried out in addition to the embodiments disclosed herein.

What is claimed is:

1. A memory device comprising:
a target block capable of storing data;
a buffer block capable of temporarily storing the data of the target block during a refresh operation of the target block;
a temporary buffer circuit configured to temporarily store or output the data of the target block or the buffer block in response to a buffer control signal;
a target block manager configured to store a target block address of the target block on which the refresh operation is to be performed and output a refresh signal for the target block corresponding to the target block address when an auto refresh command is received;
a data transmission controller configured to output a first transmission signal or a second transmission signal and the buffer control signal for transmitting the data between the target block or the buffer block and the temporary buffer circuit in response to the refresh signal;

a block erase controller configured to output a first erase signal and the buffer control signal for erasing the target block when the data of the target block is transmitted from the temporary buffer circuit to the buffer block and configured to output a second erase signal and the buffer control signal for erasing the buffer block when the data of the target block is transmitted from the temporary buffer circuit to the target block; and an operation circuit configured to transmit read, program, or erase operation voltages to the target block or the buffer block in response to the first or second transmission signal or the first or second erase signal.

2. The memory device according to claim 1, wherein the target block manager stores the target block address corresponding to the target block, and updates the target block address with an address of a next target block when the refresh operation of the target block has ended.

3. The memory device according to claim 2, wherein the target block manager stores and updates a target page address corresponding to a target page on which the refresh operation is to be performed among a plurality of pages included in the target block.

4. The memory device according to claim 1, wherein the data transmission controller outputs a first transmission end signal after outputting the first transmission signal and the buffer control signal so that the data is transmitted from the target block to the temporary buffer circuit and the data is transmitted from the temporary buffer circuit to the buffer block, in response to the refresh signal, and outputs a second transmission end signal after outputting the second transmission signal and the buffer control signal so that the data is transmitted from the buffer block to the temporary buffer circuit and the data is transmitted from the temporary buffer circuit to the target block, when an erase end signal is received from the block erase controller.

5. The memory device according to claim 4, wherein the block erase controller outputs the first erase signal for erasing the target block in response to the first transmission end signal and outputs the second erase signal for erasing the buffer block in response to the second transmission end signal.

6. The memory device according to claim 5, wherein the block erase controller outputs the erase end signal to the data transmission controller when an erase operation of the target block has ended and outputs an address count signal to the target block manager when an erase operation of the buffer block has ended.

7. The memory device according to claim 6, wherein the target block manager updates the target block address with the address of a next target block and ends the refresh operation, when the address count signal is received.

8. The memory device according to claim 1, wherein the operation circuit outputs the read operation voltages for transmitting the data from the target block to the temporary buffer circuit and outputs the program operation voltages for transmitting the data stored in the temporary buffer circuit to the buffer block, in response to the first transmission signal.

9. The memory device according to claim 1, wherein the operation circuit outputs the read operation voltages for transmitting the data from the buffer block to the temporary buffer circuit and outputs the program operation voltages for transmitting the data stored in the temporary buffer circuit to the target block, in response to the second transmission signal.

10. The memory device according to claim 1, wherein the operation circuit outputs the erase operation voltages for erasing the target block in response to the first erase signal and outputs the erase operation voltages for erasing the buffer block in response to the second erase signal.

11. The memory device according to claim 1, wherein, when a plurality of pieces of logical page data is stored in a target page included in the target block, the temporary buffer circuit includes a plurality of latches for storing the plurality of pieces of logical page data, respectively.

12. The memory device according to claim 11, wherein the temporary buffer circuit transmits the plurality of respective pieces of logical page data included in the latches to pages included in the buffer block.

13. The memory device according to claim 1, wherein at least one of memory blocks is set as the buffer block.

14. The memory device according to claim 13, when a plurality of planes each of which includes a plurality of memory blocks are included in the memory device, the buffer block is set to each of the planes or set in at least one plane among the planes.

15. A memory device comprising:
a target block capable of storing data;
a buffer block capable of temporarily storing the data of the target block during a refresh operation of the target block;
a temporary buffer circuit configured to temporarily store or output the data of the target block or the buffer block in response to a buffer control signal;
a target block manager configured to store and update a target block address of the target block on which the refresh operation is to be performed and repeatedly output a refresh signal for the target block corresponding to an updated target block address until a refresh end command is received, when a self refresh command is received;
a data transmission controller configured to output a first transmission signal or a second transmission signal and the buffer control signal for transmitting the data between the target block or the buffer block and the temporary buffer circuit in response to the refresh signal;
a block erase controller configured to output a first erase signal and the buffer control signal for erasing the target block when the data of the target block is transmitted from the temporary buffer circuit to the buffer block and configured to output a second erase signal and the buffer control signal for erasing the buffer block when the data of the target block is transmitted from the temporary buffer circuit to the target block; and
an operation circuit configured to transmit read, program, or erase operation voltages to the target block or the buffer block in response to the first or second transmission signal or the first or second erase signal.

16. The memory device according to claim 15, wherein the target block manager repeatedly outputs the refresh signal until the refresh end command is received when the self refresh command is received.

17. The memory device according to claim 15, wherein the target block manager stores the updated target block address and ends the refresh operation when the refresh end command is received.

18. A memory device comprising:
a target block capable of storing data;
a buffer block capable of temporarily storing the data of the target block during a refresh operation of the target block;
a temporary buffer circuit configured to temporarily store or output the data of the target block or the buffer block;

a refresh command determiner configured to receive an auto refresh command, a self refresh command, or a refresh end command and output an auto refresh signal, a self refresh start signal, or a self refresh end signal according to the received command;

a target block manager configured to store a target block address of a next block when an auto refresh operation or a self refresh operation of the target block has ended and configured to output a refresh signal for controlling the refresh operation according to the auto refresh command, the self refresh command, or the refresh end command;

a data transmission controller configured to control data transmission between the target block, the buffer block, and the temporary buffer circuit in response to the refresh signal; and a block erase controller configured to control an erase operation of the target block or the buffer block according to an order in which the data is transmitted from the temporary buffer circuit to the buffer block or the target block.

19. The memory device according to claim 18, wherein the refresh command determiner outputs the auto refresh signal for performing the refresh operation on the target block when the auto refresh command is received, outputs the self refresh signal for performing the refresh operation on the target block and then successively performing the refresh operation by selecting the next block as the target block, when the self refresh command is received, and outputs the self refresh end signal for ending the refresh operation after performing the refresh operation only up to a currently selected target block when the refresh end command is received after execution of the self refresh command.

20. A method of operating a memory device, the method comprising:
    transmitting data of a target block to a temporary buffer circuit when an auto refresh command is received;
    programming the data transmitted to the temporary buffer circuit to a buffer block;
    erasing the target block;
    transmitting the data programmed to the buffer block to the temporary buffer circuit;
    programming the data transmitted to the temporary buffer circuit to the target block; and
    erasing the temporary buffer block.

21. The method according to claim 20, further comprising:
    updating to an address of a next target block after erasing the temporary buffer block.

22. The method according to claim 21, wherein transmitting data of a target block to a temporary buffer circuit comprises respective pieces of logical page data stored in a target page of the target block being stored in different latches included in the temporary buffer circuit.

23. The method according to claim 22, wherein programming the data transmitted to the temporary buffer circuit to a buffer block comprises the respective pieces of logical page data stored in the different latches of the temporary buffer circuit also being programmed as the same logical page data in a selected page of the buffer block.

24. The method according to claim 23, wherein the logical page data programmed to the buffer block is also programmed as the same logical page data to the target page of the target block through the temporary buffer circuit.

25. A method of operating a memory device, the method comprising repeatedly performing until a refresh end command is received:
    transmitting data of a target block to a temporary buffer circuit when a self refresh command is received;
    programming the data transmitted to the temporary buffer circuit to a buffer block;
    erasing the target block;
    transmitting the data programmed to the buffer block to the temporary buffer circuit;
    programming the data transmitted to the temporary buffer circuit to the target block;
    erasing the temporary buffer block; and
    updating an address of a next block of the target block to a next target block.

26. The method according to claim 25, further comprising:
    determining whether a refresh command is the self refresh command or an auto refresh command, before the transmitting the data of the target block to the temporary buffer circuit, when the refresh command is received.

* * * * *